(12) United States Patent
Blank et al.

(10) Patent No.: US 10,408,645 B2
(45) Date of Patent: Sep. 10, 2019

(54) CORRECTING BIAS IN PARAMETER MONITORING

(71) Applicant: Deere & Company, Moline, IL (US)

(72) Inventors: Sebastian Blank, Moline, IL (US);
Noel W. Anderson, Fargo, ND (US);
Dohn W. Pfeiffer, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/723,330

(22) Filed: Oct. 3, 2017

(65) Prior Publication Data

US 2018/0120133 A1    May 3, 2018

Related U.S. Application Data

(63) Continuation-in-part of application No. 15/340,704, filed on Nov. 1, 2016.

(51) Int. Cl.
| | | |
|---|---|---|
| *G01D 18/00* | (2006.01) | |
| *A01B 63/00* | (2006.01) | |
| *A01D 41/127* | (2006.01) | |
| *A01B 79/00* | (2006.01) | |
| *A01B 76/00* | (2006.01) | |

(52) U.S. Cl.
CPC ......... *G01D 18/002* (2013.01); *A01B 63/002* (2013.01); *A01B 79/005* (2013.01); *A01D 41/1273* (2013.01); *A01B 76/00* (2013.01); *A01D 41/127* (2013.01)

(58) Field of Classification Search
CPC combination set(s) only.
See application file for complete search history.

(56) References Cited

U.S. PATENT DOCUMENTS

| | | | |
|---|---|---|---|
| 5,421,416 A | 6/1995 | Orbach et al. | |
| 5,995,895 A | 11/1999 | Watt et al. | |
| 7,313,478 B1 | 10/2007 | Anderson et al. | |
| 9,668,420 B2 | 6/2017 | Anderson et al. | |
| 2008/0306804 A1 | 12/2008 | Opdycke et al. | |

FOREIGN PATENT DOCUMENTS

WO    2015150747 A1    10/2015

OTHER PUBLICATIONS

Sebastian Blank et al., "A Fuzzy Approach to Low Level Sensor Fusion with Limited System Knowledge", 13th International Conference on Information Fusion, Edinburgh, UK, Jul. 2010. 7 pages.
Yield Monitor Data Post-Calibration (Linear and Non-Linear) Examples, 8 pages. Downloaded Sep. 2016.
Combine harvester monitoring based on a single-board microcomputer, Iowa State University, 1983. 131 pages.
U.S. Appl. No. 15/061,108, filed Mar. 4, 2016, Application and Figures, 47 pages.
U.S. Appl. No. 14/616,571, filed Feb. 6, 2015, current prosecution history, 94 pages.
U.S. Appl. No. 14/822,848, filed Aug. 10, 2015, current prosecution history, 120 pages.
U.S. Appl. No. 15/340,704, filed Nov. 1, 2016, Application and Figures, 57 pages.
U.S. Appl. No. 15/340,704 Office Action dated May 30, 2010, 23 pages.

*Primary Examiner* — Ratisha Mehta
(74) *Attorney, Agent, or Firm* — Joseph R. Kelly; Kelly, Holt & Christenson PLLC

(57) ABSTRACT

Sensor data, and the sensors themselves are calibrated, in near real time. Sensor data from multiple mobile machines is received on a mobile machine and used to calibrate sensor data on the mobile machine.

20 Claims, 22 Drawing Sheets

CORRECTING BIAS IN PARAMETER MONITORING

CROSS-REFERENCE TO RELATED APPLICATION

The present application is a continuation-in-part of and claims priority of U.S. patent application Ser. No. 15/340,704, filed Nov. 1, 2016, the content of which is hereby incorporated by reference in its entirety.

FIELD OF THE DESCRIPTION

The present disclosure generally relates to techniques for obtaining accurate measurements of spatial parameters. More specifically, but not by limitation, the present disclosure relates to correcting post calibration bias in systems configured to measure agronomic parameters.

BACKGROUND

There are a wide variety of machines currently in use. Such machines include combine harvesters (combines), sugar cane and cotton harvesters, construction and turf equipment, planting machines, tillage machines, and nutrient applicators, among others. Many agricultural machines operate not only to perform certain machine functionality, but also to obtain information about the operation being performed.

To obtain this information, machines may use one or more sensors during the operation. These sensors may be calibrated at the time of manufacture or at some time before, during, or after the operation is performed.

Calibration generally refers to a method of accounting for inaccuracies in data measurements. To calibrate a system with one or more sensors, for example, a measurement value is compared to a known value of accuracy to determine a difference between the two. The determined difference is then used to adjust the system so that future data measurements are more accurate.

The discussion above is merely provided for general background information and is not intended to be used as an aid in determining the scope of the claimed subject matter.

SUMMARY

Sensor data, and the sensors themselves are calibrated, in near real time. Sensor data from multiple mobile machines is received on a mobile machine and used to calibrate sensor data on the mobile machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
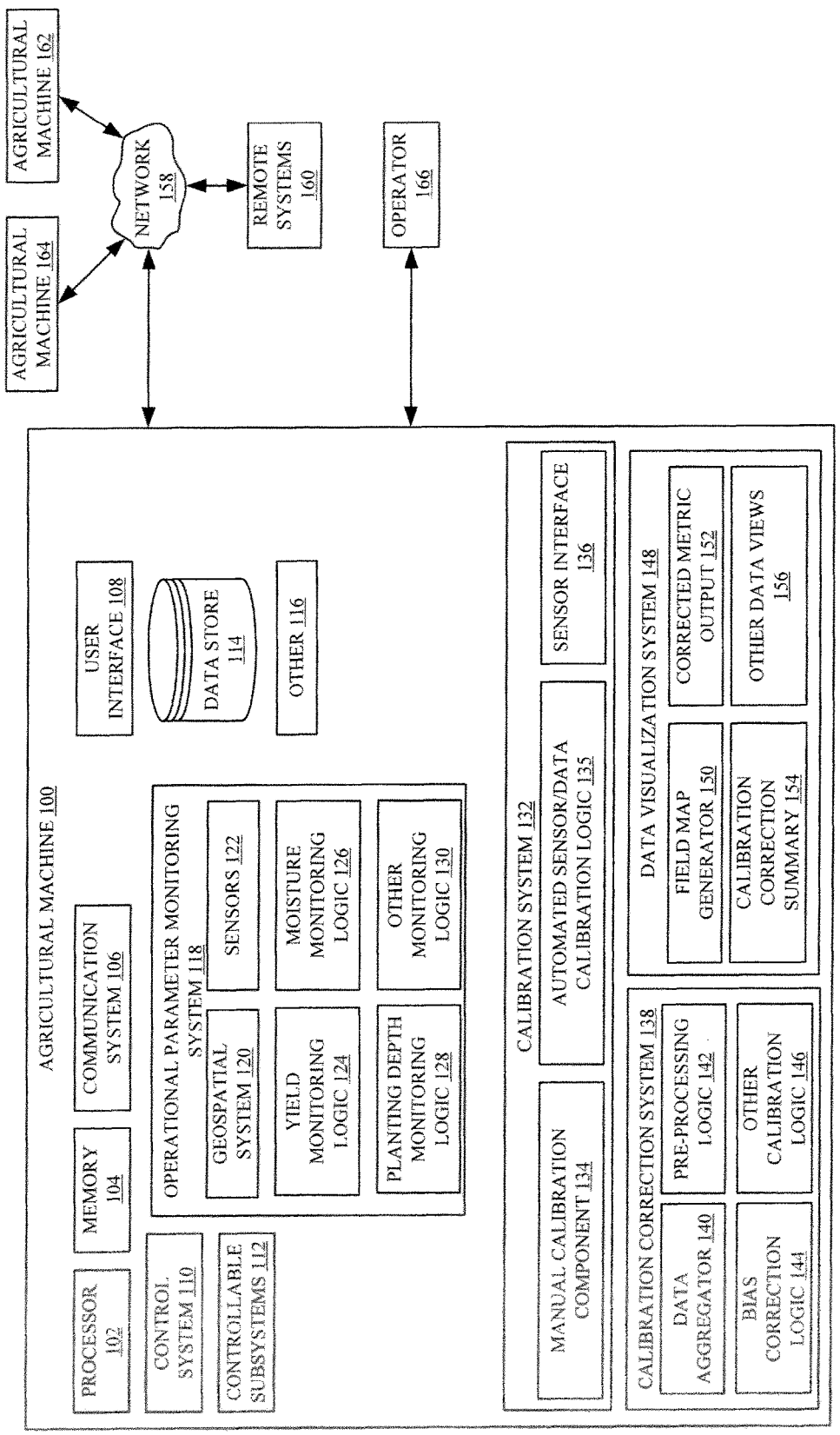
FIG. 1A is a block diagram showing one example of an agricultural machine architecture.

Agricultural machines may use systems to capture information indicative of a geospatial parameter. Agronomic parameters may include a measurable form of information that relates to the properties of the agricultural operation being performed. For instance, machines may monitor agronomic parameters such as the amount of crop that is harvested, the amount of crop planted or a depth at which planting occurs, the depth of a soil tillage, implement tow force, or the amount or type of nutrients supplied, among others. As such, the term "agronomic parameter" used herein may refer to any measurable form of information such as, but not limited to, soil properties (such as density, nutrients, moisture, etc.), crop properties (such as moisture, reflectance of different light spectra, etc.) crop yield, planting depth, tow force, down force, and crop nutrient properties, among others.

As an example, agricultural combines harvest crops in a field. While harvesting, the combine may use a sensing system that includes a grain yield monitor, which measures a mass flow of crop with an impact-based mass flow sensor or another type of sensor. As such, the sensing system monitors the amount of crop that is being harvested from the field relative to the location at which it was harvested. For purposes of discussion, crop yield generally refers to the yield of crop per unit area of land that is cultivated and is typically measured in tons per hectare (t/ha) or bushels per acre (bu/ac). It is important that crop yield is accurate, as this information can provide valuable insights as to how specific areas of land performed with respect to a certain crop. In addition, crop yield can provide insights into the performance of the agricultural machine and the sensing system.

However, there may be inaccuracies in the measurements of mass flow, and thus the actual amount of crop that is harvested will differ from the sensed amount. It is also noted that similar measurement inaccuracies may occur in other sensing systems that obtain information indicative of any of the agronomic parameters mentioned above, or others.

In an attempt to ensure that sensed measurements are accurate, sensing systems may be calibrated. In some current systems, a calibration is used to adjust a sensed value based on a determined difference between the sensed value and a value that is known to be accurate (or more accurate).

In order to calibrate sensing systems such as a grain yield monitoring system, a series of manual steps is performed by an operator. Operators are often required to start and stop harvesting to manually record accurate measurements for comparison to the sensed measurements. Upon stopping a harvesting operation, an operator may initiate a calibration sequence and briefly continue to harvest a portion of the field in order to obtain sensor information that is indicative of an estimated weight of the harvested crop. Then, the operator moves the harvested crop to an accurate scale to obtain a ground truth weight. The operator then manually enters the ground truth weight, such as a calculated weight, into the calibration system and the system uses the weight to determine a deviation from the sensed crop yield to the actual crop yield. This provides a calibration deviation for a single load. Multiple deviations for multiple loads are often required to obtain an average deviation. The deviation can be used to calibrate the system.

However, this method of calibrating a sensing system may have deficiencies. For one, it can be time consuming. It generally requires the operator to postpone harvesting, and to perform multiple calibration field passes (to obtain multiple loads). In addition, this particular method can result in data inaccuracy. For example, inaccuracies may arise from the operator manually entering crop yield information, using a variety of different machines (e.g. multiple combines harvesting in the same field), variations in an accurate measurement device (e.g. a scale), and a variety of other factors.

Further, some current calibration systems do not allow a calibration adjustment to be applied to previously obtained (e.g. historical) data. This can result in calibration induced offsets in a single machine. That is, these will be an offset in the data values collected pre-calibration (the historical data) and those values collected post-calibration. There may also be calibration induced offsets between multiple machines. For instance, it may be beneficial for operators to use several machines in a single field as this can decrease the amount of time that it takes to harvest a crop. However, as a calibration is performed on each individual machine, there may be variances between the total estimated crop yield amongst all machines as the sensors on each machine may vary from one machine to the next. Some current calibration operations may not apply the calibration adjustment to other machines. In addition, there may be variances that cannot be overcome by calibrating the devices themselves, such as sensor manufacturing and assembly tolerances, noise, wear and fatigue-related behavior, differences in maintenance operations and incorrect usage (such as by choosing an incorrect calibration curve, based on the crop).

Thus, there is a need for a system that accurately calibrates sensing systems and automatically corrects any post-calibration deficiencies. It will be noted that some examples of the present disclosure include a system that reduces the amount of manual steps involved in performing a calibration, decreases the operator time that is required to perform a calibration sequence, reduces calibration-induced offsets within a single machine, reduces machine-to-machine calibration bias, and/or provides more accurate sensed data, which leads to more accurate agronomic maps, improved agronomic decision making, and/or improved operational performance.

FIG. 1 is a block diagram of one example of an agricultural machine 100. Agricultural machine 100 illustratively includes one or more processors 102, memory 104, communication system 106, user interface 108, control system 110, controllable subsystems 112, data store 114, and other components 116. FIG. 1 also shows that, in one example, machine 100 can include an operational parameter monitoring system 118, a calibration system 132, a calibration correction system 138, and a data visualization system 148.

In one example, user interface 108 includes operator input mechanisms and output mechanisms. The output mechanisms can be mechanisms that convey information to operator 166, such as visual display devices, audio devices, haptic feedback devices, etc. In one example, user interface 108 interacts with data visualization system 148 to produce a variety of output mechanisms that are indicative of monitored operations, which will be discussed in further detail below. The operator input mechanisms can include a wide variety of different mechanisms that can be actuated by operator 166 to control and manipulate various systems and subsystems (e.g. controllable subsystems 112) of agricultural machine 100. The operator input mechanisms, for instance, can include levers, steering wheels, pedals, joysticks, buttons, keypads, touch sensitive display devices, and user input mechanisms on user interface displays, among a wide variety of other input mechanisms.

Control system 110 may receive sensor signals from sensors 122 and generate control signals to control the various controllable subsystems 112. It is shown in FIG. 1 that sensors 122 are included in operational parameter monitoring system 118. It is also noted that sensors 122 may be included in the general architecture of agricultural machine 100, and are therefore not limited to sensing signals indicative of operational parameters. Also, in the example described below with respect to FIGS. 4-10, additional or different sensors can be used, such as aggregate and sectional sensors, etc. Controllable subsystems 112 can include a wide variety of mechanical and computer implemented systems of agricultural machine 100 that relate to the movement of the machine, the agricultural operation that is performed, and other controllable features. Some examples are described below.

Operational parameter monitoring system 118 illustratively identifies an operational parameter associated with each of the sensor signals that is received from sensors 122 and provides that information to control system 110, so that control system 110 can accommodate various levels of signal variability obtained by sensors 122. Sensors 122 can include sensors that are configured to determine operational parameters such as grain mass flow, soil moisture, planting depth, tillage depth, tow force, down force, among a variety of others. Sensors 122 may also include a variety of other sensors such as a machine state sensor, that senses a machine state (e.g., idle, harvesting, etc.), and machine configuration sensors that sense machine configuration (such as physical settings and configuration, various levels of automation on the machine, whether the machine is in a master/slave relationship with other machines or a peer-to-peer relationship, etc.) Examples described herein may also be configured to perform loss sensing, such as grain loss sensing, and a variety of other sensing.

Operational parameter monitoring system 118 can also include geospatial system 120. Geospatial system 120 includes at least one of a global positioning system (GPS) receiver, a LORAN system, a dead reckoning system, a cellular triangulation system, a GNSS system, or other positioning system. In one example, geospatial system 120 is configured to associate signals obtained by sensors 122 with a geographical location, such as a location within a field. As such, a variety of different spatial parameter data may be obtained by sensors 122, geospatial system 120, and identified by system 118.

Operational parameter monitoring system 118 further illustratively includes yield monitoring logic 124. Yield monitoring logic 124 is configured to use sensors 122, such as grain mass flow sensors, and geospatial system 120, to estimate a crop yield at various locations in an operation environment (e.g. a field with a planted crop that is harvested). As such, yield monitoring logic 124 may use information obtained by a sensing system to estimate a yield density for a harvesting session. Operational parameter monitoring system 118 may also include moisture monitoring logic 126, and planting depth monitoring logic 128, among other monitoring logic 130. Moisture monitoring logic 126 may use soil moisture sensors (e.g. sensors 122) to estimate a moisture content of soil at various locations in the operation environment. Similarly, planting depth logic 128 may use a planting implement depth sensor (e.g. sensors 122) to estimate an average planting depth at various locations in the operation environment. Other monitoring logic 130 may be configured to monitor any other agronomic parameters discussed herein and use the sensed parameter information in association with the geospatial information.

It is also noted that the information obtained by operational parameter monitoring system 118, along with the other components of machine 100, may be stored in a variety of locations including, but not limited to, memory 104 and/or data store 114. Further, agricultural machine 100 may be in communication with one or more agricultural machines 162 and 164, and/or remote systems 160 over network 158. Network 158 may be any of a wide area network (WAN), local area network (LAN), near field communication network, cellular network, a wireless local area network (WLAN), store and forward communication system and/or a wide variety of other networks or combinations of networks.

Agricultural machines 162 and 164 may perform the same or a similar operation as that being performed by agricultural machine 100. For instance, agricultural machines 100, 162, and 164 may include combines that are performing a harvesting operation in different spatial regions of the same field. As such, it may be beneficial to utilize information from each machine in determining accurate measurements and correcting a single machine bias or multi-machine bias. Remote systems 160 may include any other systems relevant to an agricultural operation that is being performed or an agronomic parameter that is being monitored. For instance, remote system 160 can include a remote agricultural management system, other agricultural machines, and an imaging system such as an aerial imaging drone, among others.

In the example shown in FIG. 1, agricultural machine 100 also illustratively includes calibration system 132. Calibration system 132 includes a manual calibration system 134, automated sensor/data calibration logic 135, and a sensor interface 136. As briefly discussed above, at some point during the operation of agricultural machine 100, operator 166 may initiate a calibration sequence. For example, operator 166 can actuate a calibration input mechanism that is generated by user interface 108. In response to receiving actuation of the calibration input mechanism, manual calibration component 134 initiates a calibration sequence. In one example, performing a calibration sequence with manual calibration component 134 includes obtaining a sample indicative of an operational parameter and comparing that sample to a calculated value of the operational parameter. For instance, when harvesting a crop in a field, operator 166 may initiate a manual calibration sequence with manual calibration component 134 to compare an estimated crop yield to an actual crop yield, which may be obtained by weighing the sample with an accurate scale. Calibration component 134 then determines a calibration adjustment, based on the comparison, and provides that adjustment to sensor interface 136. Sensor interface 136 may calibrate sensors 122 by configuring sensors 122 to adjust a signal output that is provided by the sensors. It is also noted that automated sensor/data calibration logic 135 in calibration system 132 may be configured to perform a calibration adjustment automatically, such as in response to a predetermined calibration time, a distance traveled, an amount of data collected, a specific indication provided by operational parameter monitoring system 118, or another indication. By automatically it is meant, in one example, that it is performed without further operator input, except perhaps to authorize or initiate the calibration adjustment. The automated calibration is discussed in greater detail below with respect to FIGS. 4-10.

FIG. 1A also illustratively shows that agricultural machine 100 includes data visualization system 148. Data visualization system 148 includes a field map generator 150, a corrected metric output 152, a calibration correction summary 154, and other data views 156. It may be beneficial for operator 166 to be provided with a visualization of the performance of operational parameter monitoring system 118. For example, field map generator 150 may be configured to generate one or more field maps that include a plot of the measured parameters during operation. In one example, field map generator 150 is configured to generate a crop yield plot that is displayed with user interface 108. Prior to discussing the other various features of data visualization system 148, calibration correction system 138 will now be discussed in further detail with respect to FIG. 1B

Figure 1B:
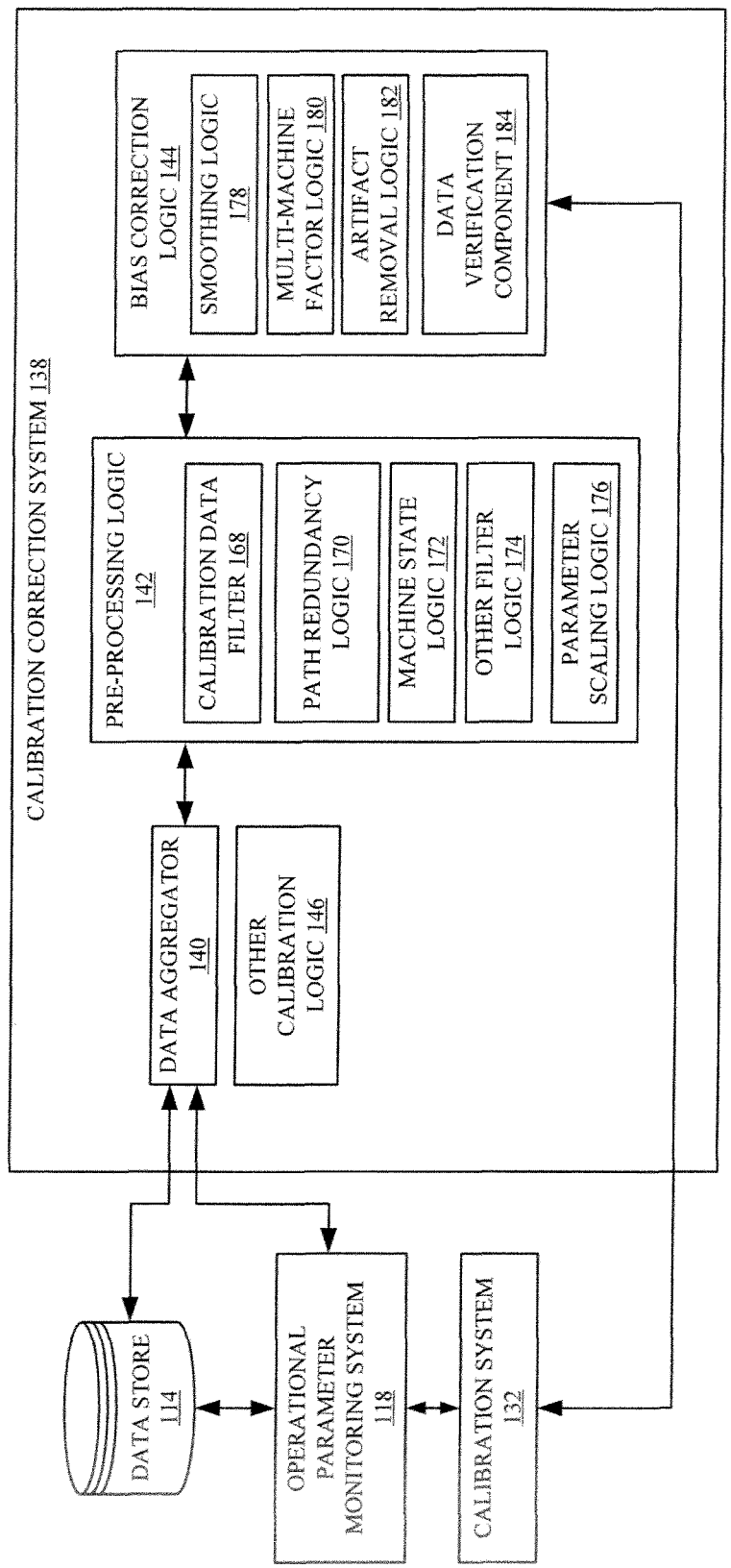
FIG. 1B is a block diagram showing one example of a calibration correction system in an agricultural machine environment.

FIG. 1B is a block diagram showing one example of calibration correction system 138 in the agricultural machine architecture, with some items shown in more detail. Calibration correction system 138 illustratively includes a data aggregator 140, pre-processing logic 142, bias correction logic 144, and other calibration logic 146. It is shown in FIG. 1B that data aggregator 140 may receive a variety of information relating to the operation of agricultural machine 100 from operational parameter monitoring system 118 and/or data store 114. It is also noted that data aggregator 140 may be configured to crawl data store 114 and parse one or more data sets for use with calibration correction system 138. For instance, in an example where operation parameter monitoring system 118 monitors a crop yield during harvesting operation (e.g., by using yield monitoring logic 124), data aggregator 140 may receive or obtain data that is indicative of the crop yield at various locations within a harvesting operation, where those locations are provided by geospatial system 120. Of course, it is also noted that data aggregator 140 may obtain any of the data related to moisture monitoring logic 126, planting depth logic 128, other monitoring logic 130, and any other information that is obtained by geospatial system 120 and sensors 122. Data aggregator 140 may then provide the obtained sensor signal information to pre-processing logic 142.

Pre-processing logic 142 is configured to prepare the obtained data for use with bias correction logic 144. At some point, it may be beneficial for the data that is aggregated to be filtered based on one or more filter criteria. The filter criteria may be defined by one or more pieces of filter logic. As such, pre-processing logic 142 includes a calibration data filter 168. Calibration data filter 168 illustratively includes path redundancy logic 170. Path redundancy logic 170 may filter the parameter data obtained by data aggregator 140 by removing any sensor signals from redundant geospatial locations. For example, during harvesting, a combine or agricultural machine 100 may perform a single pass across a field to harvest a crop in a row. In some instances, an operator may be required to perform an additional pass over that same row to harvest any crops that were missed on the first pass. Similarly, an operator may be required to make a pass where there is less than a full header width of crop. The remaining portion of the header may be passing over an already harvested area of the field. The information from the part of the header that is not harvesting, or the information for that entire pass, can be filtered out.

In addition, or alternatively, pre-processing logic 142 may perform a fusion operation that combines obtained information. For instance, calibration data filter 168 may determine similar sets of information and combine those similar sets to generate a fused set of obtained information. This is described in more detail below with respect to FIG. 10.

Parameter data may also be filtered based on a machine state that is determined by machine state logic 172 (which can include sensors). Machine states can be indicative of the particular condition of a machine during an operation. For example, but not by limitation, machine states can include any of the following; an idle state, an idle waiting to unload state, a field transport state, a road transport state, a harvesting state, a harvesting while unloading state, and headland turn state, among others. Some of the parameter data that is obtained by sensors 122 may not be relevant if the data is obtained during a certain machine state. For example, when an operator performs a headland turn, which is a turn at the end of a row pass to position the machine for a next pass on the adjacent row, a crop yield sensor (such as a grain mass flow sensor) may continue to obtain data during the turn. However, the data obtained during the turn may not include an indication of a crop being harvested as machine 100 may temporarily leave the harvestable area of the field. In addition, or alternatively, parameter data may be filtered based on an identified delay correction, such as a delay correction that is applied due to a change in machine speed that is inconsistent with the rate at which sensor information is captured. Any delay correction that is performed may be identified as a delay period that occurred while capturing sensor information. Machine state logic 172 may, accordingly, identify a set of spatial information that was obtained during a correction period. As such, machine state logic 172 may determine irrelevant parameter data based in part on an identified machine state, and remove said irrelevant data.

It is also contemplated that a variety of other filter logic 174 may be applied to filter the relevant parameter data in accordance with calibration data filter 168. For instance, other filter logic 174 may determine data points that are determined to be statistical outliers within a set.

In addition to filtering the obtained parameter data, pre-processing logic 142 may prepare the obtained parameter data in a variety of other ways. It is illustratively shown in FIG. 1B that pre-processing logic 142 includes parameter scaling logic 176. In one example, parameter scaling logic 176 is configured to scale the obtained parameter data based on a parameter correction factor. To scale the parameter data, logic 176 determines a statistical offset in a set of obtained parameter data. For instance, logic 176 determines a statistically significant standard deviation in a set of obtained parameter data. This may be a statistically significant (e.g. not due to sampling error alone, and rather a characteristic of the whole set) standard deviation between sensed crop yields (e.g., mass flow, density) from a variety of locations within a sampling region. In addition, or alternatively, determining a statistical offset may include determining a standard deviation of the mean, an upper limit of the sensed parameter data, etc. Based on the degree of statistical offset, parameter scaling logic 176 may determine a parameter correction factor and scale the data accordingly.

In the example of sensing crop yield as an agronomic parameter, parameter scaling logic 176 recalculates a yield from a sensed mass flow, machine speed, and header width (e.g. a component of controllable subsystems 112) to remove a yield upper limit. Upon removing a yield upper limit, the yield values may be scaled by parameter scaling logic 176 based on a determined yield correction factor. Once the yield correction factor is determined and the yield values are scaled, logic 176 may then calculate a new yield upper limit and truncate the determined yield values above the new yield upper limit. As such, scaling logic 176 may include a mechanism for determining a more accurate operational parameter by scaling the estimated parameters in relation to one another.

In one example, once the obtained parameter data is prepared by pre-processing logic 142, the prepared data is provided to bias correction logic 144 to reduce a bias determined between the prepared data. It is shown in FIG. 1B that bias correction logic 144 includes smoothing logic 178, a multi-machine factor logic 180, artifact removal logic 182, and data verification logic 184.

When multiple machines are harvesting in the same field, there may be a sensing system bias that occurs from machine to machine. In addition, when there is a single machine harvesting in a field, there may be a sensing system bias between the sensors on that machine, or sensors may drift over time for various reasons. Conventional systems may exhibit a sensing system bias, either internally (single machine) or externally (multiple machines) that reflects a 10-50% difference between sets of sensed operational parameters. The present system thus accounts for these determined offsets and provides accurate operational parameter outputs from each machine that is operating.

In one example, bias correction logic 144 provides a post-calibration algorithm that statistically calculates bias from machine to machine, or from sensor-to-sensor on an individual machine, or for a same sensor over time, to reduce the bias and output accurate parameter data. Operational parameter monitoring system 118 may obtain multiple sets of parameter data. In an operation where a single machine is used, each set of data is indicative of, for example, a set of parameter data that is obtained in a determined spatial region of the field. For instance, a first set corresponds to data obtained during a first harvesting pass (e.g. harvesting a first set of rows), while a second set corresponds to data obtained during a second harvesting pass (e.g. harvesting a second set of rows). Where multiple machines are used, each set of data that is obtained may be obtained by a different agricultural machine. For instance, a first set may correspond to data obtained by agricultural machine 100, while a second set corresponds to data obtained by agricultural machine 162, and a third set corresponds to data obtained by agricultural machine 164, etc. Each of the individual sets, regardless of whether one or more machines are used, may include parameter data from a localized region of the field. The sets may be compared to identify a bias between the sensing systems or individual sensors on a single machine, and therefore eliminate bias that occurs during measurement of those local regions.

In one example, bias correction logic 144 uses the scaled data sets, as scaled by parameter scaling logic 176. As such, the data sets have already been pre-processed to remove any identified statistical offsets within the sets. Bias correction logic 144 is then configured to analyze the sets with respect to one another, and thus determine a bias between the sets.

A variety of algorithms may be applied to the scaled parameter data with bias correction logic 144, and more specifically with smoothing logic 178. For example, smoothing logic 178 may apply a generalized additive model to smooth the parameter data in accordance with the determined latitude and longitude from geospatial system 120. Alternatively, but not by limitation, smoothing logic 178 may include a localized regression model that is executed to reduce a sensing system bias. In one example, smoothing logic 178 adjusts the yield value for each combine so that the average yield equals the original overall weighted average yield. It is also noted that smoothing logic 178 may be configured to perform a localized smoothing. For example, yield parameter data may be obtained for 1% of a total region of a field. Smoothing logic 178 will recognize that only a specific region of the field has been harvested and execute a smoothing algorithm on the data indicative of the 1% region. Upon executing the smoothing, a localized smoothing metric may be applied to data obtained from other localized regions within the field. As such, a result of performing smoothing on only a portion of the field can be used to smooth the remainder of the field data.

Multi-machine factor logic 180 is configured to determine a weighted offset value between various machines that are operating and obtaining operational parameters. For instance, it may be determined by multi-machine factor logic 180 that between each machine operating in a field, there is a sensing system bias of approximately 3% from machine-to-machine. As such, multi-machine factor logic 180 will determine a yield span across the machines and a deviation from one machine to another. The yield span and deviation may be used to generate a multi-machine factor that is applied with smoothing logic 178.

It is also noted that even when sensors (across a single machine or between multiple machines) have a relatively low bias (e.g., less than +/−2%), this does not guarantee that accurate parameter data will be determined by bias correction logic 144. For instance, there may be transient characteristics within the data. It may be beneficial to identify and remove these transient characteristics to provide a more accurate parameter output. For example, but not by limitation, when two combines (e.g. machines 100 and 164) are harvesting in a single field, each combine may change a forward speed depending on a machine state. The combines may need to slow down to perform a headland turn, move over rough terrain, pass over a slope or a particularly dense portion of the crop in the field, etc. When the forward speed of a combine changes while obtaining parameter data, there is generally a delay correction that is performed. For instance, there may be a delay of approximately 10 seconds between when geospatial data is obtained and when parameter data is obtained. As such, as speed is changed, the delay correction may be inconsistent until a consistent speed is reached. Of course, it is contemplated herein that delay correction can be identified and applied to a variety of channels in addition to a sensed change in speed. Regardless of the sensed channel, the need to correct delay may manifest as a need to attribute the sensed data (e.g. mass flow) to a corresponding geolocation. In conventional systems, these and other delay corrections may show up as inaccurate data parameter outputs when viewing a field map. Specifically, in some maps, these inconsistent delays may be visualized as specks or another visual inaccuracy on a field map. Artifact removal logic 182 is configured to identify and remove such artifacts that are indicative of outliers in the sensed operational parameter data.

Bias correction logic 144 also illustratively includes data verification component 184. In one example, data verification component 184 is configured to incorporate data that is provided by direct observation to further reduce the calibration bias. One example of a source of data that would be provided with a verification component 184 includes an indication of a ground truth. Ground truth may generally refer to an actual observed value of any of the parameters obtained by operational parameter monitoring system 118.

An example of ground truth for yield parameter data includes an actual measured weight of a sample of a harvested load. For instance, when harvesting a crop, the combine may place the harvested grain into a cart with one or more measurement scales (e.g. sensors 122). In another example, the agricultural machine 100 may be driven over a scale. The scales may obtain an indication of measured weight and verification logic 184 will use the indication in determining a calibration adjustment with logic 178. Two particular scenarios will now briefly be discussed. In one scenario, each combine obtains an accurate weight to determine the amount of grain that was harvested by that harvester. Data verification logic 184 then calculates a sum of the weights across all machines. Logic 184 may then compare the sum to the estimated mass flow as provided by yield monitoring logic 124 from each machine. In a second scenario, a single combine is used, and thus the single machine may obtain a final accurate weight measurement when all the field is harvested, or multiple accurate weight measurements that correspond to specific regions of the field. The measurement(s) will be reconciled by data verification component 184 and provided to smoothing logic 178 for reducing the calibration bias. It is noted that a variety of parameters in addition to crop yield may be utilized with data verification component 184.

Before describing these scenarios, it will be noted that FIG. 1B illustratively shows that bias correction logic 144 may provide determined bias reduction information to calibration system 132. For instance, bias correction logic 144 provides a bias correction factor to sensor interface 136, which uses the correction factor to adjust sensor signals generated by sensors 122. Also, as discussed in greater detail below with respect to FIG. 8, if a machine has an aggregate sensor and sectional sensors, once the post calibration is done for the aggregate sensors, it can be applied to the sectional sensors as well, or vice versa. It can also be weighted based on sensor similitude, as discussed in greater detail below with respect to FIG. 9. FIG. 1B also shows that calibration system 132 may provide an indication of the bias correction factor to operational parameter monitoring system 118. System 118 may then use the correction factor with any of the monitoring logic discussed herein to reduce data inaccuracies during operational monitoring. Further, it is noted that the determined calibration correction factor may be applied to previously obtained operational parameter data, which may be stored at data store 114. This allows agricultural machine 100 to adjust prior yield, moisture, planting depth, and other parameters data to reflect the newly accurate calibration scale.

Figure 2:
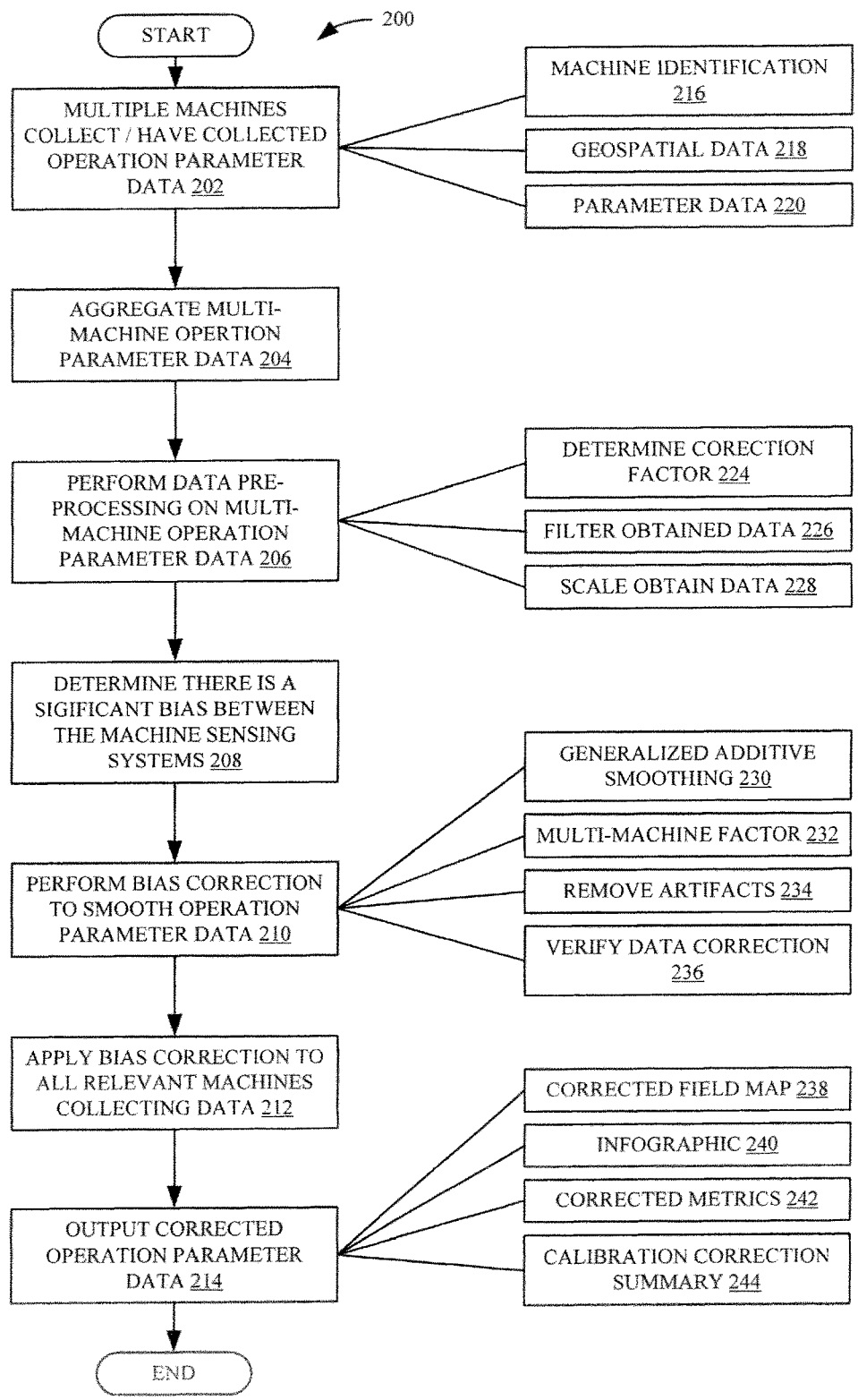
FIG. 2 is a flow diagram illustrating one example of the operation of a calibration correction system with multiple agricultural machines.

FIG. 2 illustrates one example of a method 200 illustrating the operation of the calibration correction system with multiple agricultural machines. More specifically, method 200 may include a method of reducing a sensing system bias across a first agricultural machine and a second agricultural machine.

As similarly noted above, there may be several agricultural machines performing the same or similar operations in a field at the same or different times. Calibration of the sensors on each machine may initially occur at the time of manufacture. In addition, an operator 166 may perform manual calibrations with manual calibration component 134. Thus, as agricultural machine 100 performs an operation and operational parameter data is obtained with monitoring system 118, data is unique for each machine that is operating, and it is currently difficult to reconcile that data across the machines to provide a consistent output that is representative of accurate parameter monitoring.

A calibration correction system, according to examples described herein, may operate in substantially real-time. It is noted that the term "real-time" used herein generally refers to operations that occur concurrently or with respect to one another without a great deviation between a time at which those operations are performed. The processing time does not negate the ability of the system to operate in real-time. As such, multiple machines may operate in the same field at the same time so sensor information and calibration correction is performed by the systems in substantially real-time (or near real time).

At block 202, it is illustratively shown that multiple machines collect or have collected operational parameter data. Each machine may collect a variety of data that is included but not limited to machine identification, geospatial data, and parameter data. Multiple machines collecting machine identification information is generally indicated at block 216. Each of agricultural machines 100 may include a machine identifier stored at data store 114 and provided to remote systems 116 or to the other machines via communication system 108 and over network 158. In addition, as an operation is being performed, geospatial system 120 may obtain information such as, but not limited to, latitude and longitude at a variety of time points that are indicative of when the operation occurs. Collecting geospatial data with multiple machines is generally indicated at block 218. Depending on the operation that is being performed (such as a harvesting operation, planting operation, tillage operation, or nutrient monitoring operation, among others) each machine will collect parameter data that is indicative of the operation. Collecting parameter data is generally indicated at block 220 in FIG. 2. It is also noted that collecting parameter data, in accordance with block 202, may specifically include accessing a collection of previously-collected agronomic data from data store 114 or another storage structure. Calibration correction system 138 may access a collection of data that includes a first set of data that is sensed by a first agricultural machine and a second set of data sensed by the second agricultural machine.

At block 204, it is illustratively shown that the method includes aggregating the multi-machine operational parameter data. Data aggregator 114 may aggregate the obtained data from operational parameter monitoring system 118 and/or data store 114 in preparation for performing data pre-processing. Aggregating the multi-machine parameter data may include aggregating individual data points into one or more sets, where the sets are defined by the machine that obtained the data, the location at which the data was obtained, the time at which the data was obtained, or other criteria. For instance, the first set of data is sensed by the first agricultural machine during a harvesting operation that is performed relative to a first portion of a harvesting environment, and the second set of data is sensed by the second agricultural machine relative to a second portion of the harvesting environment.

At block 206, the method includes performing data pre-processing. Performing data pre-processing can include executing any of the features discussed with respect to pre-processing logic 142 in FIG. 1B. For example, pre-processing logic 142 may determine a correction factor between the aggregated set of data based on, for example, a statistical deviation. Further, performing pre-processing may include filtering the obtained data, as indicated at block 224. Filtering the obtained data may include executing path redundancy logic 170, machine state logic 172, or other filter logic 174, as provided by calibration data filter 168. Generally, filtering the obtained data provides a mechanism for removing outliers and irrelevant data sources that will not be beneficial in generating an accurate parameter output.

Performing data pre-processing may also include scaling the obtained data, which is generally indicated by block 226. In one example, scaling the obtained data includes scaling each of the first and second sets, individually, based on a determined correction factor corresponding to each of the sets. For instance, a first offset is determined for the data in the first set and a second offset is determined for the data in the second set, and the parameter correction factor is partially based on the determined first and second offsets. Further, the first offset may be indicative of a first average deviation in the first set, wherein the first average deviation is greater than a minimum deviation threshold that is used to perform the scaling. Similarly, the second offset may be indicative of a second average deviation in the second set, wherein the second average deviation is greater than a minimum deviation threshold that is used to perform the scaling.

At block 208 of method 200, it is illustratively shown that the method includes determining that there is a bias between the sensing systems of the multiple machines. In one example, determining there is a bias includes analyzing a deviation between the average parameter output between each machine. For example, calibration correction system 138 determines there is a significant bias between an average deviation of the scaled first set and an average deviation of the scaled second set. If the bias is above a threshold, calibration correction system 138 may determine that there is a significant bias between the machines and that a calibration correction is to be used.

Block 210 of method 200 includes performing a bias correction to smooth the operational parameter data. In one example, bias correction logic 144 executes one or more smoothing functions, one of which can include generalized additive smoothing, as indicated at block 228. Executing a generalized additive smoothing with smoothing logic 178 may include adjusting the obtained operational parameter values (e.g. in the scaled first and second sets) so that the average parameter value equals the original overall weighted average parameter value. In addition, performing a bias correction can include applying a multi-machine factor with multi-machine factor logic 180, which is generally indicated at block 232. The multi-machine factor 230 can include a weighted offset that is determined by multi-machine factor logic 180, which generally indicates an offset from the overall average between each agricultural machine. Further, performing a bias correction may include removing artifacts, as indicated at block 232. For example, artifact removal logic 182 removes transient characteristics in the obtained operational parameter data such as, but not limited to, inconsistencies that result from change of speed delay corrections, data outliers, among others. Performing a bias correction also illustratively includes verifying the data correction, as indicated at block 234. Verifying the data correction may include utilizing data verification component 184 to compare the estimated data correction to a known actual value of the operational parameter. For instance, the ground truth can be determined for a crop yield and that ground truth can be utilized to determine an additional correction offset between an actual crop mass that is harvested and the estimated crop mass.

At block 212, method 200 illustratively includes applying a bias correction to all the relevant machines collecting the operational parameter data. For example, applying the bias correction may include providing a calibration offset adjustment with bias correction logic 144 to calibration system 132. As such, the sensors 122, themselves, can be calibrated or block 212 may include calibration system 132 instructing sensor interface 136 to adjust the sensor signals provided by sensors 122 so any future operational parameter data that is obtained is consistent across all machines, relative to one another.

At block 214, method 200 includes outputting the corrected operational parameter data. Corrected parameter data may be output in a variety of ways. In one example, outputting the corrected parameter data includes providing a corrected field map with field map generator 130, as indicated at block 236. A corrected field map will generally provide a smooth visualization of the output parameter (e.g., crop yield) based on the location at which the operation was performed. This may provide a real-time view for operator 166 that indicates how the machine is performing during operation. Corrected field maps will generally be discussed in further detail below with respect to FIGS. 12A and 12B. In addition, or alternatively, outputting the corrected parameter data may include outputting an infographic, as indicated by block 238. Data visualization system 148 may also generate other data views 156 that may include charts, graphs, maps, and a variety of infographic material.

Further, calibration correction system 138 may be configured to output corrected metrics, as indicated at block 240. The corrected metrics are indicative of the obtained parameter data as adjusted by bias correction logic 144. For instance, in the example of harvesting with a combine, corrected metrics 240 include an average yield compared to a percent deviation for each of the machines, and also a corrected yield compared to a deviation across an average of all of the machines. Further, outputting corrected operation parameter data can include outputting a calibration correction summary, as indicated at block 242. In one example, the calibration correction summary includes a visual output that compares the original parameter outputs to the corrected parameter outputs and the weighted offset that will be applied to future and/or historical parameter data. Metrics may also include an adjusted mass flow (kilograms per second) a combine average yield and a percent deviation from an overall average, along with a span that includes a calculated max percent standard deviation relative to a minimum percent standard deviation, among others. These are examples only.

Figure 3:
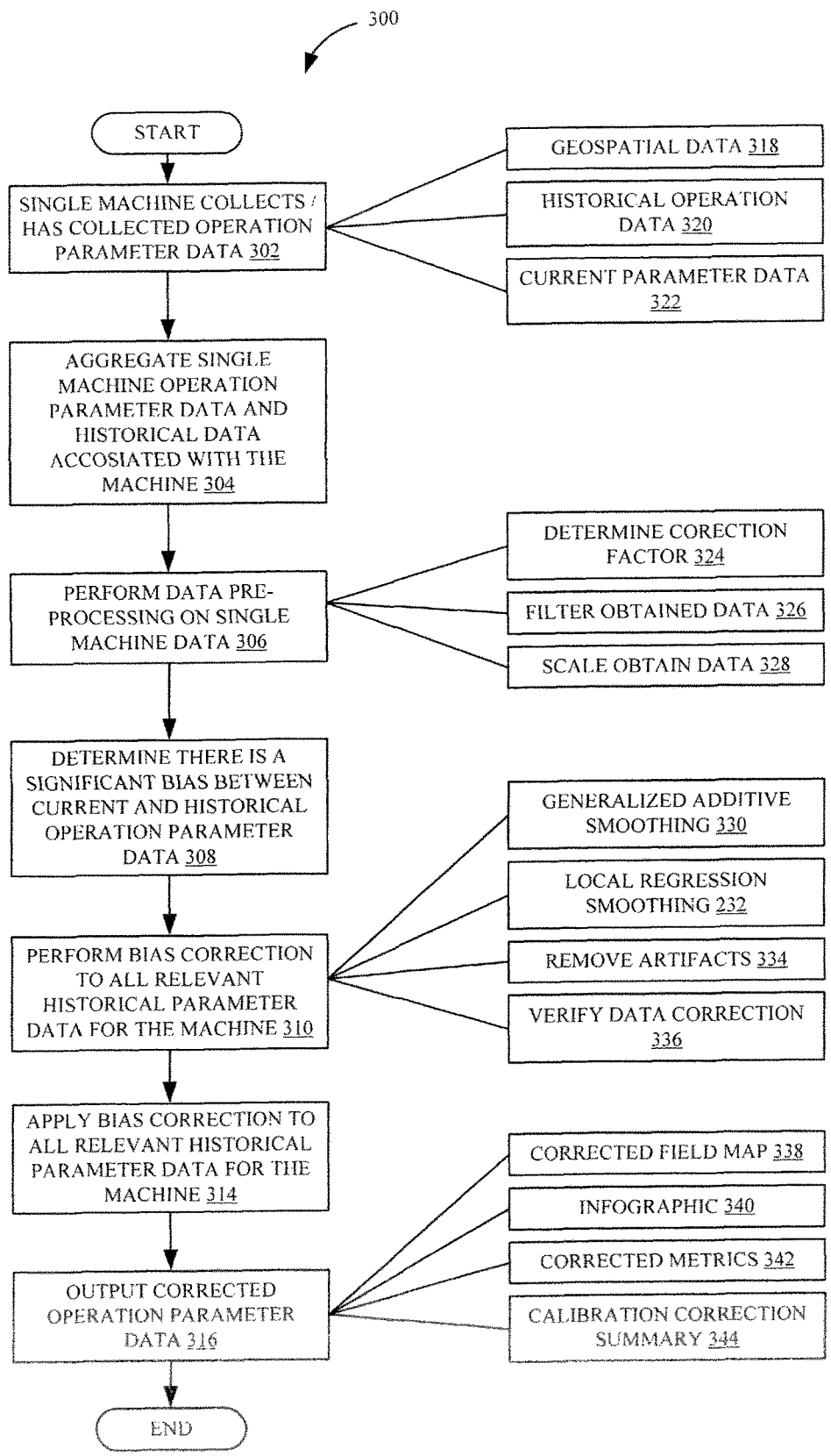
FIG. 3 is a flow diagram illustrating one example of the operation of the calibration correction system with a single agricultural machine.

FIG. 3 is a flow diagram illustrating one example of the operation of calibration correction system 138 with a single agricultural machine. In one example, method 300 includes a method of reducing a sensing system bias in an agricultural machine.

As similarly discussed above with respect to method 200, a calibration correction system and the associated systems described herein may operate in substantially real-time with respect to a single machine. For one, a standalone, single machine may perform the method of reducing sensing system bias as a direct onboard operation. Second, but not by limitation, a single machine may use a calibration correction system where that machine is processing historical spatial information in combination with information from the single machine.

At block 302, it is illustratively shown that method 300 includes collecting or accessing a collection of operational parameter data. Collecting operational parameter data may include accessing geospatial data, as indicated at block 318, historical operational data, as indicated at block 320, and/or a current parameter data, as indicated at block 322.

Upon collecting or accessing the data, method 300 proceeds to aggregate the data that is associated with that single machine. This is generally indicated at block 304. As similarly discussed above with respect to FIG. 2, data aggregator 140 may aggregate the parameter data from operational parameter monitoring system 118 and/or data store 114. When a single machine is operating, aggregating data may include aggregating the data into one or more sets. For instance, each set may include data obtained during a specific operation timeframe, from a specific region in a field, etc. In one example, a first set includes agronomic data that is sensed during a first pass of the agricultural machine in an operation environment, and a second set includes agronomic data that is sensed during a second pass of the agricultural machine in an operation environment. The first set may refer to data obtained during a current operating session, while the second set may refer to data obtained during an operating session that was performed at some previous time. These are examples only.

Data pre-processing may be performed on the obtained (and aggregated) parameter data, as indicated at block 306. It is noted that performing data pre-processing may include any of the pre-processing features discussed with respect to FIG. 2 (method 200, block 206) and preprocessing logic 142 of FIG. 1. As shown in FIG. 3, performing pre-processing includes determining a correction factor, as indicated at block 324, filtering the obtained data, as indicated at block 326, and scaling the obtained data, as indicated at block 328. It is also noted that scaling the obtained data in accordance with block 328 can include using parameter scaling logic 178 to analyze a localized region of data for a specific field, and applying the localized pre-processing to a remainder of the field data. In one example, data scaling includes adjusting each of the first and second sets, individually, based on a determined correction factor corresponding to each of the sets. The parameter correction factor may be determined by a statistical deviation between the data contained within each of the sets.

At block 308, method 300 includes determining a bias between the first and second sets, such as between current and historical operational parameter data that is obtained with the single machine. Determining a bias may include calibration correction system 138 determining there is a bias between an average deviation of the scaled first set and an average deviation of the scaled second set. Of course, a bias may be determined in a variety of other ways as well.

At block 310, the method includes performing a bias correction to smooth the scaled first and second sets from the machine, such as the current and historical operational sets. The bias correction that is performed with respect to FIG. 2 and multiple machines that are performing an operation may be also applied to method 300 for a single machine. As such, block 310 illustratively includes executing generalized additive smoothing with smoothing logic 178. In addition, or alternatively, smoothing logic 178 may execute local regression smoothing, as indicated at block 332. Utilizing local regression smoothing may generally not include using a combine factor because the regression only requires information from a single machine. One example of a smoothing regression that may be applied, using smoothing logic 178, to information obtained with a single machine, includes a Gaussian process regression. In addition, or alternatively, smoothing logic 178 may include a generalized linear model that may be applied to either single machines or multiple machine instances. Of course, it is noted that a variety of different geospatial smoothing operations for several data sources with source specific correction that may be applied. Performing the smoothing operation may include generating a calibration correction factor, and applying that calibration factor to the adjusted (e.g. scaled) first and second sets of data obtained by the single machine.

Performing the bias correction may also include removing artifacts, as indicated at block 334, using artifact removal logic 182 to identify data outliers and transient characteristics in the parameter data. In addition, verifying a data correction is indicated at block 336, which may include using data verification component 184 to compare a ground truth (such as an actual yield as determined by a measurement with an accurate scale) to the scaled sets of parameter data.

At block 314, a bias correction is applied to all the relevant historical parameter data for the machine. Applying the bias correction to historical data may smooth all of the parameter data obtained by the single machine for a specific operation. This generates operational parameters that are accurate for the entire operation period.

At block 316, the corrected operational parameter data is output which may include any of: outputting a corrected field map and infographic, as indicated at blocks 338 and 340, respectively; corrected metrics, as indicated at block 342; and/or a calibration correction summary, as indicated at block 344; or any of the other outputs discussed with respect to FIG. 2 (method 200, block 214) and data visualization system 148.

Figure 4:
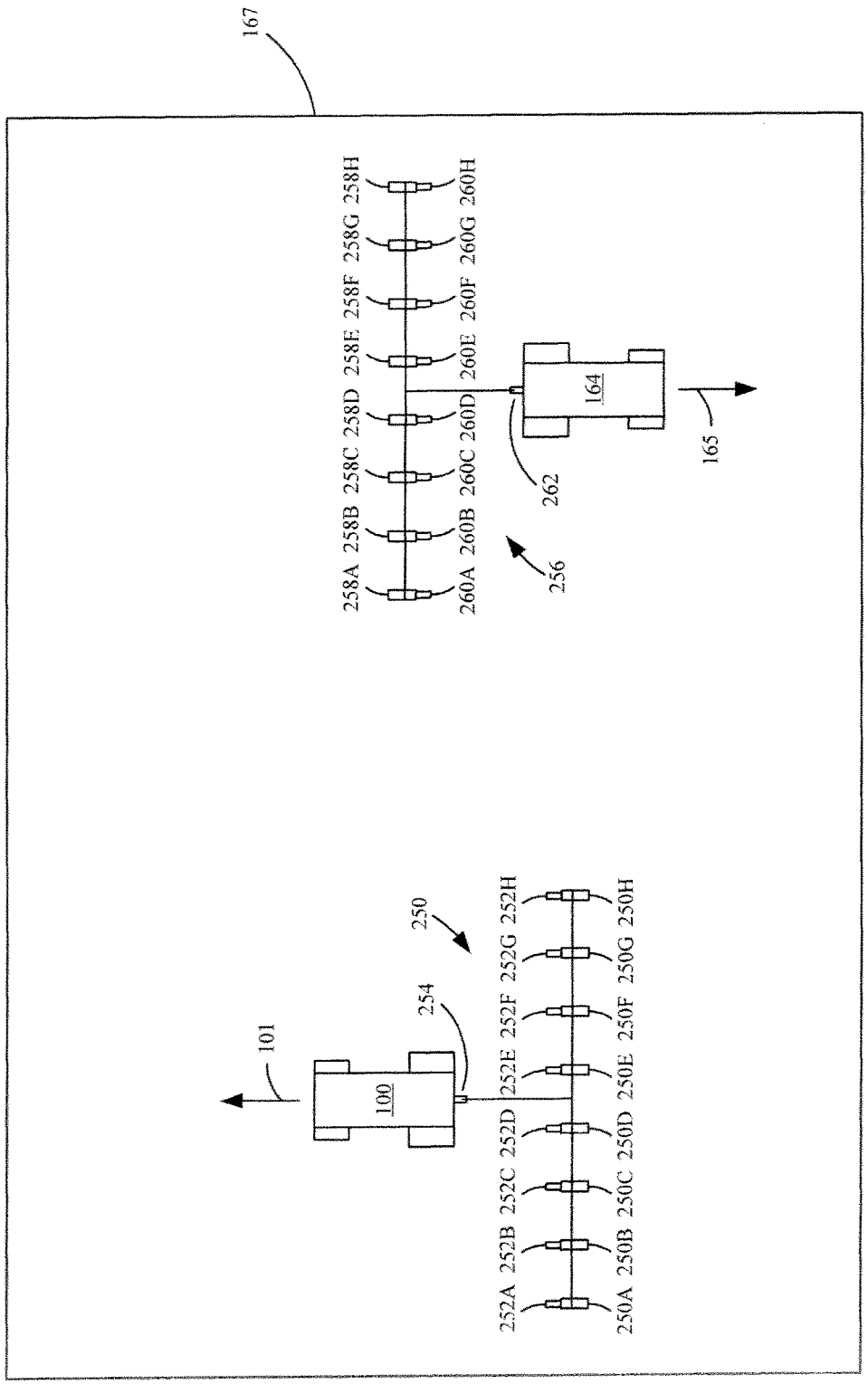
FIG. 4 is a pictorial view of two agricultural machines.

FIG. 4 is a pictorial illustration showing one example of agricultural machines 100 and 164 operating in a field 165. Agricultural machine 100 can be a tractor that is illustratively a towing machine that tows an implement 250. Implement 250 is illustratively a tillage implement with a plurality of ground engaging elements 250A-250H. Each ground engaging elements illustratively has a sectional sensor 252A-252H. Each sectional sensor 252A-252H illustratively detects a frictional force indicative of a force of the earth being tilled by the corresponding sectional ground engaging tillage element. By way of example, each ground engaging tillage element 250A-250H may be a shank that engages and tills the ground. Thus, each sectional force sensor 252A-252H illustratively measures a force exerted on the corresponding tillage element by the ground, as implement 250 is towed through the field. FIG. 4 also shows that, in one example, agricultural machine 100 also includes an aggregate traction force sensor 254 that senses an aggregate traction force needed by machine 100 to pull the towed implement 250. Thus, the aggregate traction force sensed by sensor 254 should illustratively equal a sum of the sectional forces sensed by sensors 252A-252H. However, this may not be the case. In addition, the sectional sensors 252A-252H may be out of calibration with one another, or with other similarly situated sensors. It will also be noted that the sensors can sense a wide variety of other variables, such as soil properties (moisture, temperature, nutrient content, etc.) and other things.

FIG. 4 also shows that agricultural machine 164 can be a tractor that tows a towed implement 256. Implement 256 also illustratively includes a set of ground engaging elements 258A-258H, each with its own sectional force sensor 260A-260H. Agricultural machine 164 also illustratively has an aggregate traction force sensor 262. These items operate similar to those discussed above with respect to machine 100 and towed implement 250.

Figure 5:
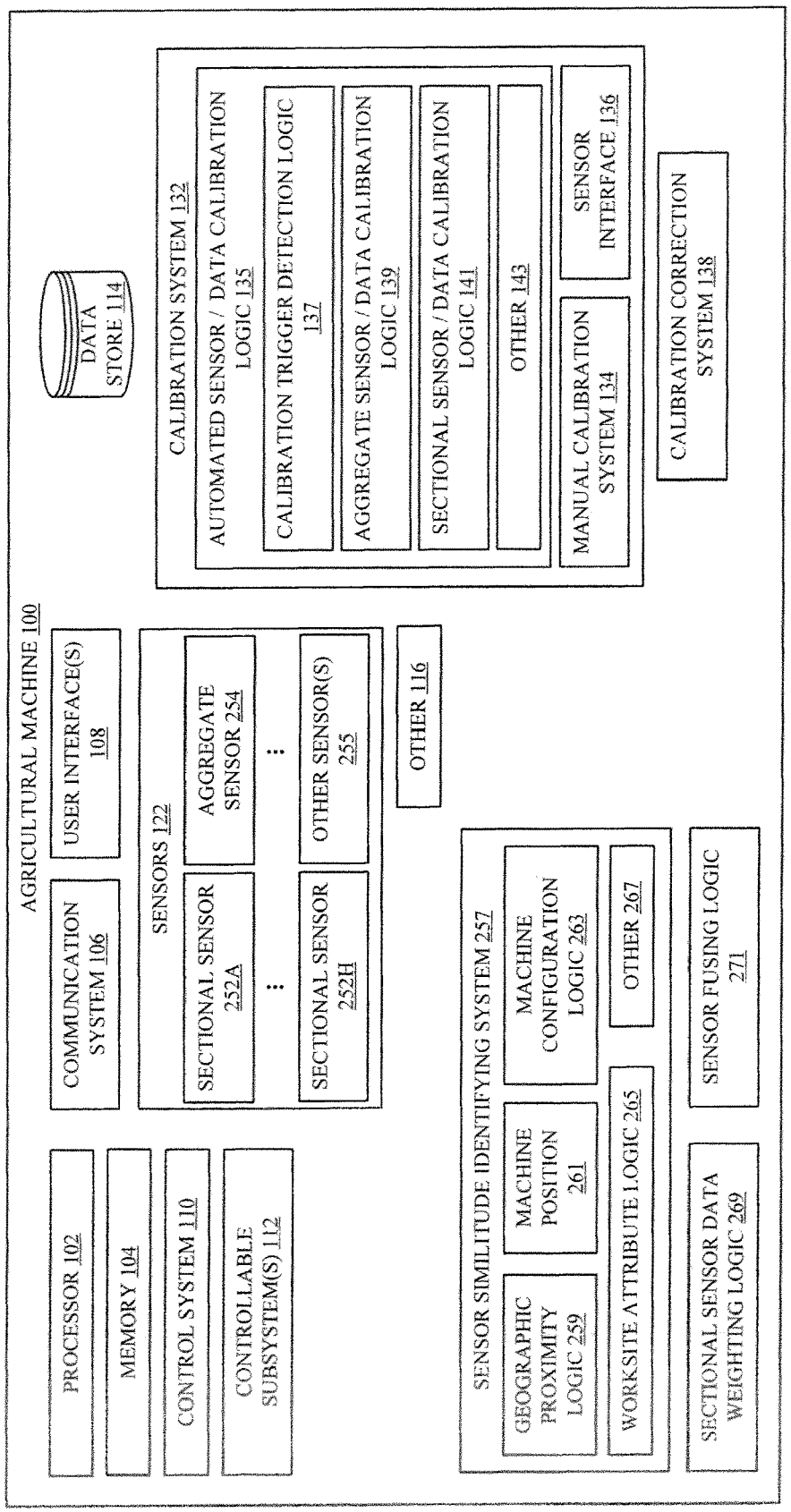
FIG. 5 is a block diagram of one example of an agricultural machine.

FIG. 5 is a block diagram showing another example of machine 100. Some of the items are similar to those shown in FIGS. 1A and 1B, and they are similarly numbered. FIG. 5, however, shows that sensors 122 can include the sectional sensors, such as sectional sensors 252A-252H (or other sectional sensors), and an aggregate sensor (such as sensor 254), along with a wide variety of other sensors 255.

FIG. 5 also shows that, in one example, machine 100 includes a sensor similitude identifying system 257. System 257 illustratively identifies sectional sensors that may be similarly situated to one another. When correcting or performing post calibration of a given sensor or the data generated by the sensor, the sensor data generated by a different sensor, that has a relatively high degree of similitude with the given sensor under analysis, can be weighted more heavily than the data from other sensors that may not be as similarly situated. It will be noted that, as described in greater detail below, the sensors that are similarly situated may not even be on the same machine. For example, sensor 252H and sensor 260A (FIG. 4) will pass in relatively close proximity to one another as machines 100 and 164 travel in the directions indicated by arrows 101 and 165. Thus, the sensors 252H and 260A may share a relatively high degree of similitude because they are performing an operation on ground that is closely adjacent, so the ground characteristics may be similar.

Similarly, it can be seen that ground engaging element 250C is engaging the ground almost directly behind one of the tires of machine 100. Therefore, the ground being engaged by ground engaging element 250C may be relatively compacted, relatively to ground engaged by some of the other ground engaging elements. The same is true of ground engaging element 250F. Therefore, it may be that sensors 252C and 252F have a high degree of similitude based upon where they are located on the machine (e.g., behind the wheels of the towing vehicle). The same is true of ground engaging elements 258C and 258F. Therefore, the sensors 260C and 260F may have a high degree of similitude with one another, and with sensors 252C and 252F. Thus, when a correction and/or post calibration operation is performed to calibrate those sensors and to recalibrate the data generated by those sensors, the data from those four sensors may be given a high weight relative to the weight of data or sensor signals generated by other sensors that are not so similarly situated.

Therefore, in one example, sensor similitude identifying system 257 can include geographic proximity logic 259 that identifies a similitude between different sensors based upon their geographic proximity relative to one another in the field that they are operating on. Thus, they may have a high similitude even though they are not on the same implement or machine. Machine position logic 261 illustratively identifies sensor similitude based upon their relative positions on the machine or implement that they are deployed on. Thus, for instance, the sensors on an implement that are tracking behind a tire of the towing vehicle may be given higher similitude than the similitude between those sensors and other sensors that are not tracking behind a tire. The similitude among the sensors may be based particular machine configuration of the machine being used as well, and this type of similitude is identified by machine configuration logic 263. Further, a similitude among the sensors may be generated based on a worksite attribute by worksite attribute logic 265. By way of example, it may be that sensors have a relatively high degree of similitude with one another (either on the same machine or on different machines) based on the worksite topography, soil type, soil surface condition, crop species, crop hybrid, crop vigor, crop disease, etc. Sensor similitude identifying system 257 can include a wide variety of other logic 267 that can identify sensor similitude in a wide variety of other ways as well.

Once the similitude among the various sensors in the system has been identified (and it will be noted that this can be similitude of sensors on a single machine or across multiple machines, or both) then sectional sensor data weighting logic 269 can generate weights that weight sensor data from sensors having a high degree of similitude higher than data from sensors that have a lower degree of similitude. Sensor fusing logic can fuse sensor signal values and generate quality indicators for parameters of interest (as described in greater detail below with respect to FIG. 10). The quality indicators can be used to weight the data as well.

The data weighting can then be provided to calibration correction system 138, where the weighted data can be used to generate calibration corrections so that the sensors, themselves, can be corrected, so that the data from the sensors can be calibrated or post calibrated, and/or so that other operations can be performed.

FIG. 5 also shows a portion of calibration system 132 in more detail. In the example shown in FIG. 5, automated sensor/data calibration logic 135 illustratively includes calibration trigger detection logic 137, aggregate sensor/data calibration logic 139, sectional sensor/data calibration logic 141, and it can include a wide variety of other items 143. Calibration trigger detection logic 137 illustratively detects a trigger indicating that a correction and/or post calibration operation is to be performed on the data and/or sensors. The triggers can take a wide variety of forms, and a number of those triggers are described in more detail below with respect to FIG. 6.

Aggregate sensor data calibration logic 139 illustratively calibrates the data generated by an aggregate sensor and can also automatically calibrate the aggregate sensor itself. For instance, a calibration can be run on data generated by aggregate traction force sensors 254 and 262 in FIG. 4. When the correction or calibration factors are identified, they can be used by aggregate sensor/data calibration logic 139 to perform a post calibration on data already generated by aggregate sensor 254 and to correct data captured in the future by sensor 254. It can also be used to reconfigure sensor 254 to calibrate it so the signal that it generates is more accurate.

Sectional sensor/data calibration logic 141 illustratively performs the calibration and correction operations on sectional sensors (such as sectional sensors 252A-252H and 260A-260H). This can be done in a variety of different ways. For instance, where there is an aggregate sensor, the calibrated data for the aggregate sensor can be used to calibrate the sectional sensors that generate sectional signals that correspond to the aggregate signal generated by the aggregate sensor. By way of example, and as shown in FIG. 4, the output of force sensors 252A-252H should equal the aggregate signal generated by aggregate traction force sensor 254. Once the data generated by sensor 254 (or sensor 254 itself) has been corrected or recalibrated, then the recalibrated data can be used to correct or recalibrate the data from the sectional sensors 252A-252H, or to recalibrate those sensors, themselves. One example of this is described in greater detail below with respect to FIG. 8.

It will be appreciated that automated sensor/data calibration logic 135 can include a wide variety of other items 143 that can perform automated, real time calibration of data generated by sensors, and/or of the sensors themselves, on a machine.

Figure 6:
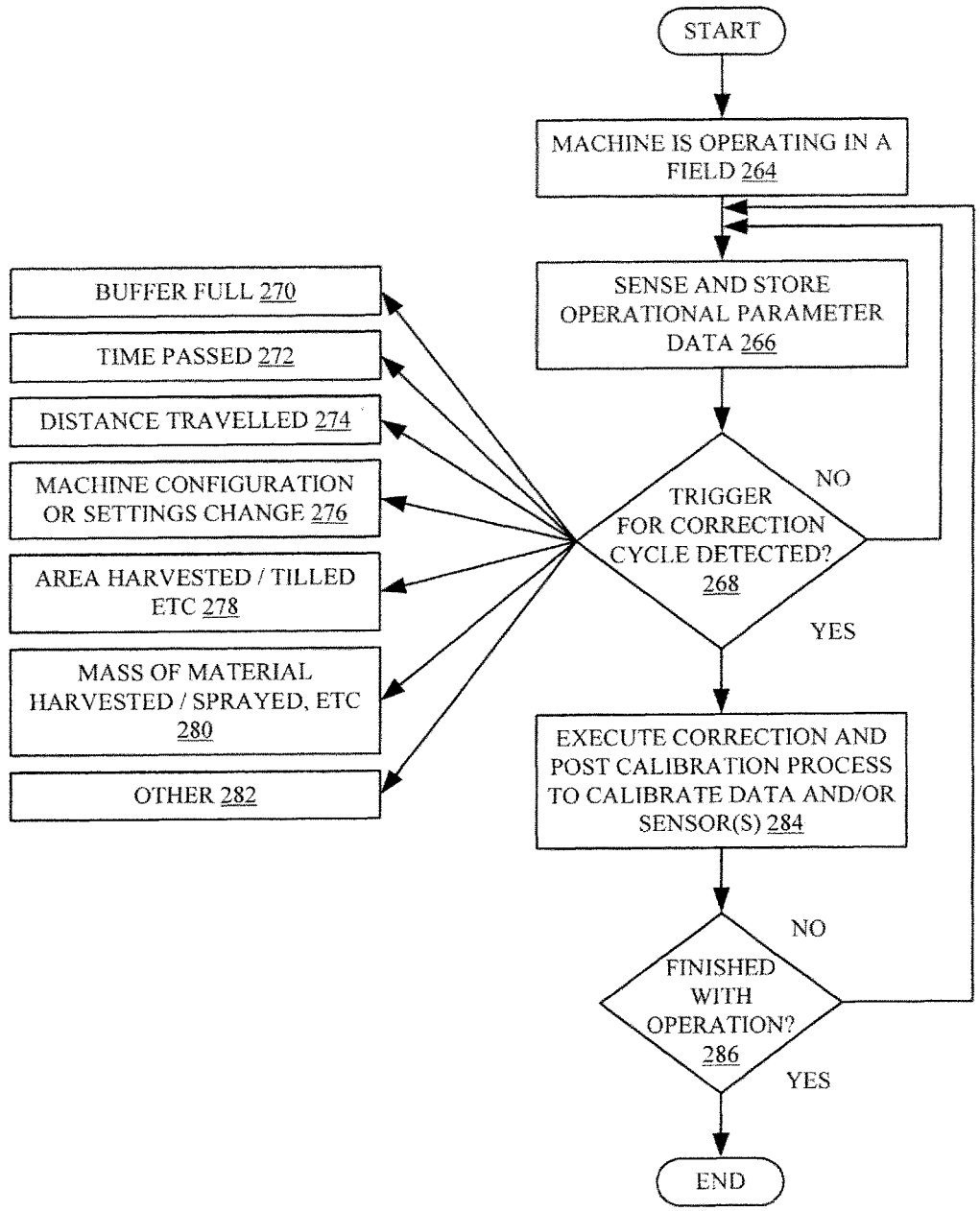
FIGS. 6, 7, 8, 9 and 10 are flow diagrams illustrating examples of the operation of an agricultural machine.

FIG. 6 is a flow diagram illustrating one example of the operation of a single agricultural machine (such as machine 100) in performing real time (or near real time) on-board calibration of the data collected by sensors 254 and 252A-252H. In the example illustrated in FIG. 6, this is performed without considering any data obtained from machine 164 and the corresponding sensors. In the example illustrated in FIG. 6, it is assumed that machine 100 is operating in field 165. This is indicated by block 264 in FIG. 6. It is also assumed that sensors 252A-252H and 254 all sense and store operational parameter data (in this case, the individual force exerted on each sectional ground engaging element and the aggregate traction force) as the machine is performing its operation. Sensing and storing the operational parameter data is indicated by block 266 in the flow diagram of FIG. 6.

At some point, calibration trigger detection logic 137 detects that it is time for machine 100 to perform a correction cycle (e.g., calibration on the sensors and/or the sensor data as described above). Detecting a trigger to perform the correction cycle is indicated by block 268 in FIG. 6. The trigger can take a wide variety of different forms. For instance, as the sensors 122 generate sensor signals, the information corresponding to those sensor signals may be stored in a buffer in memory 104 or data store 114. When the buffer is full, this may trigger a correction cycle (or calibration cycle). This is indicated by block 270 in the flow diagram of FIG. 6. Further, it may be that calibration trigger detection logic 137 detects a trigger that triggers a calibration or correction cycle intermittently or periodically, based upon the amount of time that has passed since a last calibration was performed. This is indicated by block 272. It may detect a trigger based on a distance traveled by machine 100, as indicated by block 274. It may detect a trigger differently based on changes in the machine configuration or machine settings, as indicated by block 276. It may detect a correction or calibration cycle trigger based upon an area harvested or tilled (or otherwise operated on), as indicated by block 278. It may detect a correction or calibration cycle trigger based upon an amount (such as a mass) of material harvested (in the example in which machine 100 is a harvester or sprayed (in an example in which machine 100 is a sprayer), etc. This is indicated by block 280. The calibration or correction cycle may be triggered in a wide variety of other ways as well, and this is indicated by block 282.

When the trigger is detected, logic 137 generates a signal to calibration correction system 138 to perform a calibration or correction cycle as discussed above. In doing so, it can take, as the sets of data upon which calibration is performed, the data that was previously gathered during the operation in the field (e.g., the same operation but gathered at an earlier time) as one set of data and the currently gathered data (e.g., from the buffer) as another set of data. It can thus perform post calibration on the previously collected data as well. Executing the correction and post calibration process to calibrate the data and/or sensors is indicated by block 284 in the flow diagram of FIG. 6. This process can continue (the real time, on-board correction and calibration on a single machine) until the machine is finished with the operation, or until other criteria are met. This is indicated by block 286 in the flow diagram of FIG. 6.

Figure 7:
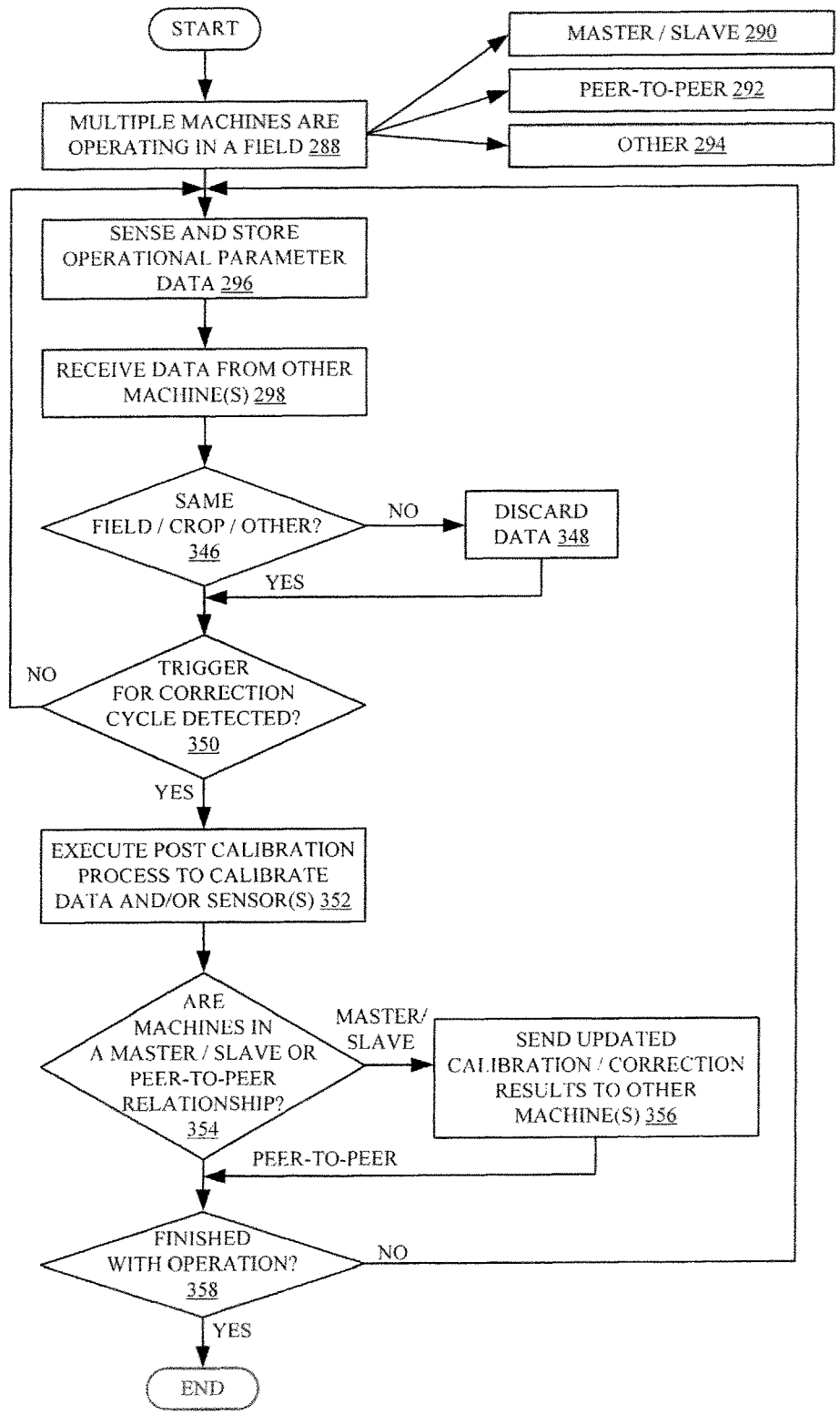

FIG. 7 is a flow diagram illustrating one example of the operation of machine 100 in performing the real time calibration and correction using data generated from a plurality of different machines (such as machines 100 and 164 in FIG. 4). It is first assumed that multiple machines are operating in a field. This is indicated by block 288 in the flow diagram of FIG. 7. It will be noted that the machines can be operated in a master/slave configuration 290 or in a peer-to-peer configuration 292, or in other ways 294. In a master/slave configuration, data from all of the slave machines is sent to a master machine where the correction and post calibration operations are performed. The calibration information and correction information is then sent from the master machine to the various slave machines where it is used to perform calibration and/or sensor correction. In a peer-to-peer configuration, all of the machines receive data from all of the other machines, and each machine performs its own correction and calibration or post calibration operations. It uses the result of those operations to correct the sensors and/or the sensor data. Calibration can also be done in the cloud with the results sent to the machines, or in other ways.

Machine 100 then senses and stores its own operational parameter data. This is indicated by block 296. Machine 100 also illustratively receives data corresponding to operational parameters sensed by other machines (such as machine 164). This is indicated by block 298. Calibration correction system 138 then determines whether the data received from the other machine(s) is relevant for performing a post calibration and correction process. For instance, it may not be relevant if it is not from the same field, or if machine 164 is harvesting a different crop, etc. Determining whether the data is relevant is indicated by block 346. If it is not, then the data is discarded, because it will not be used in any type of correction or post calibration process on machine 100. Discarding the irrelevant data is indicated by block 348.

Calibration trigger detection logic 137 then determines whether a trigger has been detected in order to perform a correction or post calibration process. This is indicated by block 350. The triggers can be the same as those discussed above with respect to blocks 268-282 in FIG. 6, or they can be different. If no trigger has been received yet, then the machine continues to sense and store the operational parameter data as indicated by block 296.

If, however, at block 350, it is determined that a trigger has been detected, then calibration correction system 138 performs the post calibration and correction process to calibrate data and/or sensors. This is indicated by block 352.

Calibration correction system 138 then determines whether machine 100 is in a master/salve or peer-to-peer relationship with the other machine or machines that it received data from. If it is in a master/slave relationship, (and it is the master) then machine 100 performs the post calibration and correction processing and provides the results to the slave machines so that corrections can be made on those machines. If it is a slave, it provides its data to the master machine and simply waits for the result of the calibration/correction process from the master. However, if it is in a peer-to-peer relationship, then the other machines are performing their own post calibration and correction processing so machine 100 need not send any corrections or calibration results to those machines.

Thus, at block 354, calibration correction system 138 determines whether machine 100 is in a master/slave relationship with machine 164, and, if so, whether it is the master. If so, then it controls communication system 106 to send the updated calibration/correction results to the slave machines (e.g., to machine 164). This is indicated by block 356.

If machine 100 is not yet finished with the operation in the field, processing reverts to block 296 where it continues to sense and store operational parameter data. Determining whether machine 100 is finished with the operation is indicated by block 358.

Figure 8:
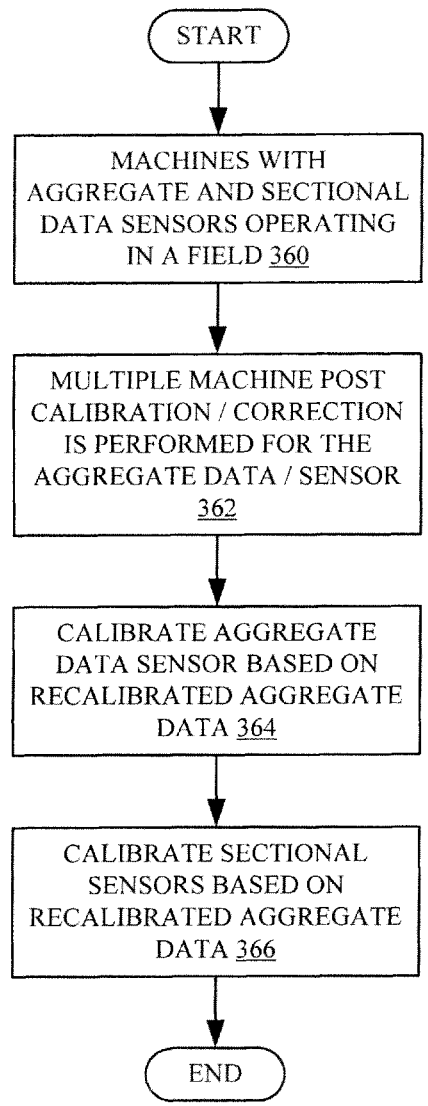

FIG. 8 is a flow diagram illustrating one example of the operation of agricultural machine 100 in performing calibration on both aggregate and sectional data sensors and on the data generated by those sensors. As briefly discussed above, it may be that machine 100 has an aggregate sensor 254 and a set of sectional sensors 252A-252H. Sectional sensors are correlated to the aggregate sensor in that the sectional sensors each sense a component of the parameter sensed by the aggregate sensor. Therefore, for instance, the sensor measurements generated by sectional sensors 252A-252H should sum to the same value as generated by aggregate sensor 254. Therefore, if a post calibration and correction are performed with respect to aggregate sensor 254, then the results of that post calibration and correction can be applied to correct or calibrate the sectional sensors and/or data corresponding to sectional sensors 252A-252H.

Therefore, in one example, multiple machines with aggregate and sectional data sensors are operating in the field. One example of this is shown in FIG. 4, and it is indicated by block 360 in the flow diagram of FIG. 8.

At some point, aggregate sensor/data calibration logic 139 will perform a multiple-machine post calibration/correction process on the aggregate sensor 254 and the data generated by aggregate sensor 254. One example of performing a multi-machine post calibration/correction process was described above with respect to FIG. 7. Performing the multiple-machine process with respect to aggregate sensor 254 is indicated by block 362 in the flow diagram of FIG. 8. In one example, sensor 254 is reconfigured or calibrated based on the recalibrated aggregate data generated by the post calibration/correction process. Calibrating or correcting the aggregate data sensor 254 is indicated by block 364.

Sectional sensor/data calibration logic 141 then calibrates or corrects the sectional sensors 252A-252H, and/or the data generated by those sensors, based upon the recalibrated aggregate data. For instance, there will illustratively be a known relationship or correlation between the sectional sensors 252A-252H and the corresponding aggregate data sensor 254. As discussed above, that relationship or correlation may be that the values generated by the sectional sensors should sum to be the same value generated by the aggregate sensor. Other types of correlations or relationships between aggregate and sectional sensors can be used as well.

The data from the sectional sensors can be calibrated and the sectional sensors can be corrected based on the calibrated aggregate data and the known correlation or relationship. Therefore, for instance, if the aggregate data generated by aggregate data sensor 254 has been corrected or changed based on the post calibration process, then the data for each of the sectional sensors can also be changed or corrected given the change or correction to the aggregate data and the known relationship (e.g., that the sum of the sectional sensor data should equal the aggregate data). Similarly, the aggregate sensor 254 and sectional sensors 252A-252H can be reprogrammed or reconfigured to correct for any biases or offsets identified in the calibration or correction process. Calibrating the sectional sensors based on the recalibrated aggregate data is indicated by block 366 in the flow diagram of FIG. 8. It will be appreciated that this can be performed on each of the machines in the multiple-machine scenario.

It will also be appreciated that, while calibrating the aggregate data and then propagating that change to the individual sectional sensor data and sectional sensors has been described with respect to FIG. 8, it will be appreciated that the opposite could happen as well. That is, the data for the sectional sensors may be calibrated in a post calibration process, and the changes made during that post calibration process can be propagated to the aggregate sensor.

Figure 9:
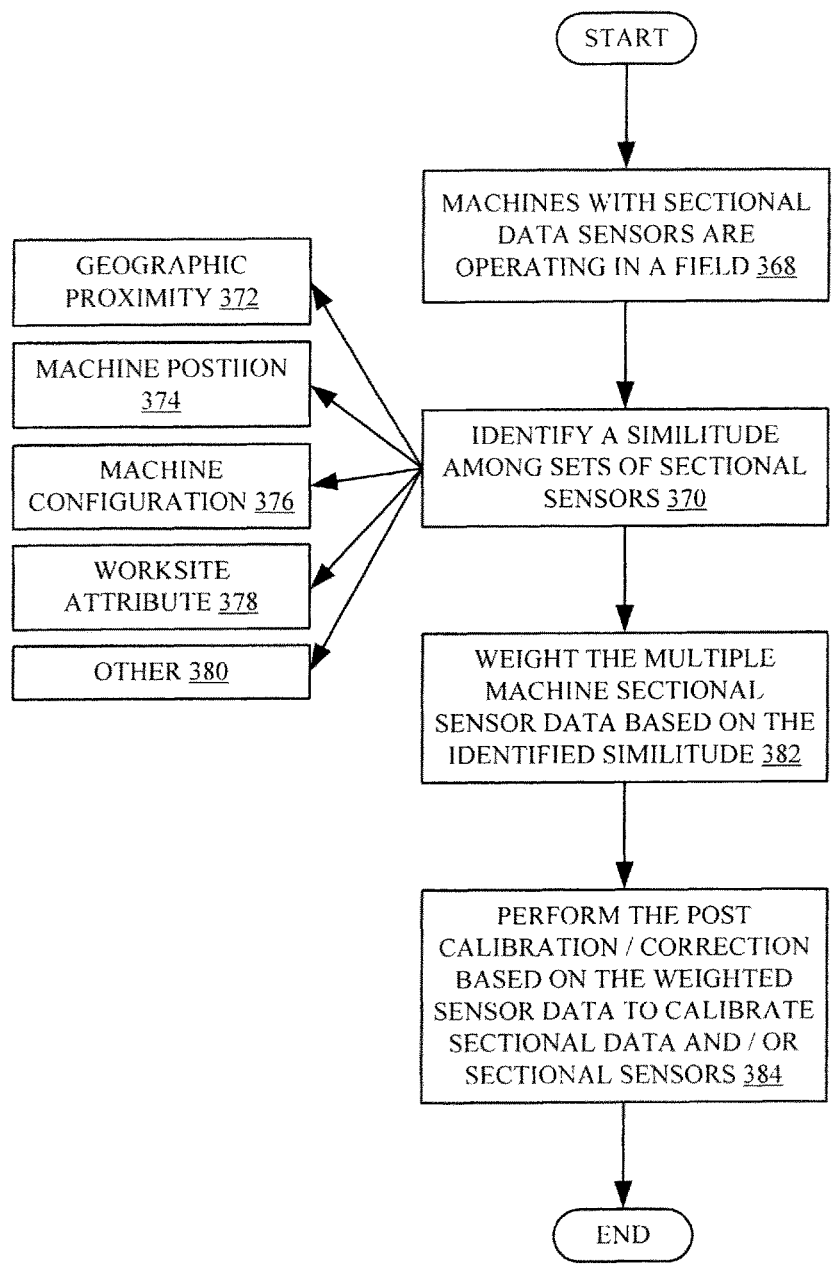

FIG. 9 is a flow diagram illustrating one example of the operation of agricultural machine 100 in identifying a similitude among various sensors so that post calibration processes and correction processes can be performed by weighting the data of similar sensors higher, when calibrating those sensors, than the data from sensors that are not as similar to the sensor being calibrated. For instance, as briefly described above with respect to FIG. 4, it may be that sensors 252H and 260A are more similar to one another than sensors 252H and 252A, even though sensors 252H and 252A are on the same implement while 252H and 260A are not. This is because sensors 252H and 260A are on ground engaging elements that are treating soil that is closely proximate each other.

Therefore, in one example, machines with sectional data sensors are operating in a field, such as that shown in the example illustrated in FIG. 4. This is indicated by block 368 in the flow diagram of FIG. 9.

Sensor similitude identifying system 257 then identifies a similitude among sets of sectional sensors. This is indicated by block 370. For example, geographic proximity logic 259 can identify a similitude among various sensors based upon their geographic proximity relative to one another in the field. This is indicated by block 372. This can be done, for instance, by identifying a position of the sensors, themselves, in the field, or by identifying a position of the machines that are carrying those sensors or towing them (such as a position of machines 100 and 164), and then identifying a position of the sensors based upon a known physical relationship between the position of the machines 100 and 164, and the locations of those sensors relative to the machine. For instance, assuming that a positioning system is located at a fixed position on machine 100, it may be that the dimensions of the machine and tow bar towing implement 250, and the width of implement 250 are known so that the geographic location of sensor 252H can be known with relatively high precision. The same can be true for sensor 260A relative to the position of machine 164. Thus, it can be determined that sensors 252H and 260A are on ground engaging elements that are operating in close proximity relative to one another. Alternatively, each ground engaging element or sensor may have its own positioning system or positioning sensor disposed on it. These and other scenarios are contemplated herein.

Machine position logic 261 can also identify a similitude among the various sensors based on the position on the particular machine where the sensors are located. This is indicated by block 374. By way of example, it may be that sensors 252C and 252F have a relatively high degree of similitude, because both are on a ground engaging element that is following in the track of a tire of machine 100. There are a wide variety of other examples of this as well, depending on the particular machine or implement on which the sensor resides. For instance, if the machine is an air seeder, then air is often delivered through hoses of different lengths. Thus, the air traveling through the hoses may experience a different pneumatic resistance, based upon the hose length. When sensors are sensing material application through the hoses, for instance, it may be that sensors that are disposed on hoses of the same length have a higher similitude than sensors that are disposed on hoses of different lengths.

Machine configuration logic 263 can also identify a similitude of various different sensors based upon the machine configuration. This is indicated by block 376.

Further, worksite attribute logic 265 can identify a similitude among various sensors based on worksite attributes. This is indicated by block 378. For instance, the sensors may have different levels of similitude based on the particular topography they are traveling over, the soil type, the soil surface conditions (e.g., moisture level, etc.), the crop species, the crop hybrid, the crop vigor (which may be determined based on normalized difference vegetation index (NDVI) graphical indications), crop disease, etc. Also, it will be noted that the present system can be used on substantially any crops or plants on the worksite, including, without limitation, grain plants, forage plants, biomass plants, grasses, weeds, shrubs and trees, among a wide variety of others.

It will be noted that the similitude of the various sensors can also be identified in a wide variety of other ways. This is indicated by block 380.

Once sensor similitude identifying system 257 has identified similar sensors, then sectional sensor data weighting logic 269 illustratively weights the multiple-machine sectional sensor data based on the identified similitude. This is indicated by block 382. For instance, when performing a post calibration process on sensor data (or when performing a correction process for a given sectional sensor), the data corresponding to other similar sensors (or those having a relatively high degree of similitude) are illustratively weighted more heavily than the data from the other sensors.

Once the data is weighted, then calibration correction system 138 illustratively performs the post calibration/correction with respect to the sensors and sensor data based on the weighted sensor data. The results are used to calibrate the sectional data and/or sectional sensors based upon the weighted data. This is indicated by block 384.

Figure 10:
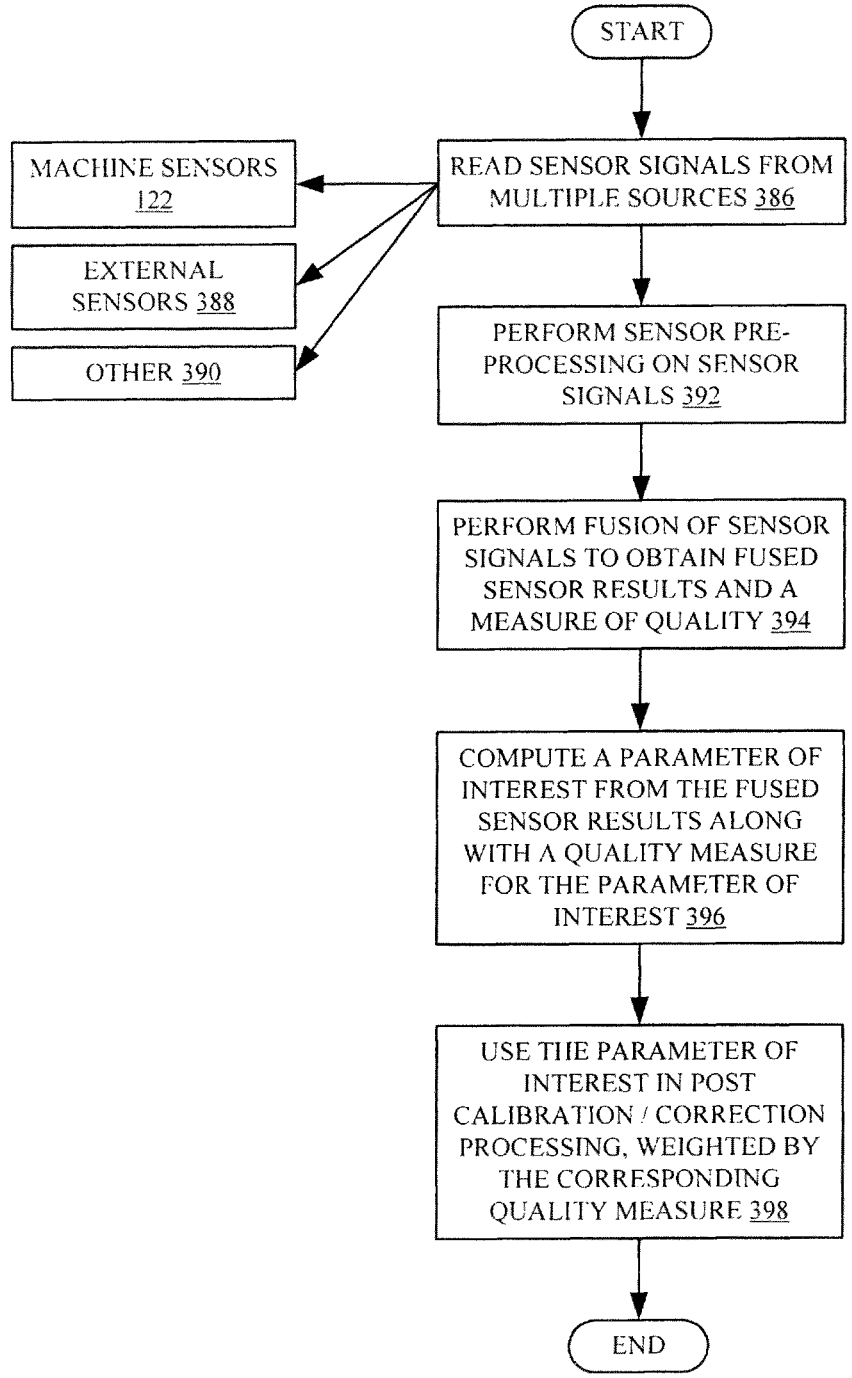

FIG. 10 is a flow diagram illustrating one example of the operation of machine 100 in performing sensor data fusion (which fuses multiple sensors indicative of a similar parameter) together, in order to obtain not only a sensor value, but a quality measure corresponding to that sensor value. The quality measure may indicate the quality of the sensor data, such as whether it was sensed under conditions that are favorable to a high accuracy sensor reading, or under other conditions which may affect the quality of the sensor data in terms of its accuracy.

Sensor fusing logic 271 first reads sensor signals from multiple different sources. This is indicated by block 386 in the flow diagram of FIG. 10. The sensors can be machine sensors 122, they can be external sensors 388, or a wide variety of other sensors 390. Pre-processing logic 142 then performs sensor pre-processing on the various sensor signals that have been read. This is indicated by block 392 and one example of this is described above with respect to pre-processing logic 142 in FIG. 1B.

Sensor fusing logic 271 then performs fusion on the sensor signals to obtain fused sensor results and a measure of quality corresponding to each of the results. This is indicated by block 394. There are a variety of different types of mechanisms or algorithms for performing sensor fusion. For example, one is set out in Blank et al., "A Fuzzy Approach to Low Level Sensor Fusion with Limited System Knowledge", $13^{th}$ International Conference on Information Fusion. Edinburgh, UK, July 2010. This is only one method of performing fusion, and others may be used as well. Other examples include Kalman filtering, voting logic, using a Bayesian network and the Dempster-Shafer approach.

Once the sensor signals have been fused and a quality measure is obtained for each, then a parameter of interest is generated from the fused sensor results, along with a quality measure for the parameter of interest. This is indicated by block 396. For instance, it may be that the sensor signals are not directly indicative of the parameter of interest, but the parameter of interest is to be derived from the sensor signals. In that case, then the parameter of interest can be derived or computed from the sensor signals and the quality of the parameter of interest can also be derived or computed based upon the quality measure corresponding to each of the sensor signals used in the computation of the parameter of interest.

The parameter of interest can then be used by calibration correction system 138 in performing the post calibration and correction processing. The parameter of interest used in the post calibration and correction process may be weighted based on the quality measure. Therefore, those parameters of interest that have a higher quality may be weighted more heavily in the post calibration/correction process than those which have a relatively low quality measure associated with them. Using the parameter of interest in the post calibration/correction processing, weighted by the corresponding quality measure, is indicated by block 398 in the flow diagram of FIG. 10.

Before proceeding with a description of a number of various machines, it will be appreciated that the present description can apply very widely, to other machines in the agricultural, construction, forestry, turf management and other industries, in addition to those described. For instance, the ground engaging elements shown in FIG. 4 may be planter or seeder row units, or construction ripping elements. These are just two examples in addition to the agricultural tillage example described above with respect to FIG. 4.

Additional examples of sectional sensors may include planting/seeding draw force sensors, down pressure sensors, additional soil attribute sensors, such as soil moisture, soil nutrients, etc. The sensors can include yield sensors. Further, where the machine is a rotary mower with a single rotating blade or motor or multiple rotating blades or motors, then the crop density may be sensed, because it may be proportional to an energy used by the rotary mower drive mechanism to drive the blades. For instance, the power consumption may be correlated to a vegetation attribute and the aggregate/sectional sensor post calibration can be applied in that scenario as well.

The present description can apply to material application scenarios, where material flow from an aggregate source (such as a hopper or another container) onto the field, is sensed. The sensed data can be calibrated and corrected as described above. An initial amount of material taken to the field is typically known from a weight or volume of material in the applicators, or on a supply transport vehicle. In the field, a known amount of material is deposited in each applicator machine and a fixed or variable application rate of material can then be applied to the field based on initial applicator calibrations and settings. Material is metered from a material reservoir to the worksite, as it is applied. Due to miscalibration, the applicators may apply more material or less in covering the assigned areas (e.g., in following their mission plan). Therefore, the actual material applied to the field may be more or less than the prescribed amount. The difference for each application relative to the prescribed amount may be used for post calibration of the actual amount applied, and for sensor correction, etc. It will be noted that material application equipment can vary widely as well. It can include, for instance, granular or powder material applicators, liquid applicators, gas applicators (including NH3 applicators), sprayers, seeders, planters, etc.

The present description can also be applied to unmanned aerial vehicles which are increasingly used to gather data from agricultural, construction, turf and forestry worksites. In some examples, this data includes images or echo data (e.g., LIDAR data, sonar data, etc.) for making three-dimensional ground surface maps or other surface maps. The conversion of raw data into surface data often means that calibration data must be supplied for the imaging attributes of the cameras and the orientation of the sensors in space relative to the orientation of the sensors on the unmanned aerial vehicle. This may be obtained using gravimetric sensors, accelerometers, etc. UAV sensing systems can be out of calibration, or they may become out of calibration over time. The post calibration and correction described herein can be applied in this scenario as well.

Similarly, UAVs may be thermal, optical or other sensors to measure soil or plant attributes (such as temperature, health, composition, etc.) among a wide variety of other things. If multiple UAVs and sensors are used to collect data, then the post calibration/correction techniques described herein may be used. This may also be used if the sensors on the UAVs are from different manufacturers or different technologies. In one example, the sensors may be infrared, near infrared, red and/or green sensors used to collect data for use in an NDVI calculation. The present processing can be used to post calibrate the data and/or correct the sensors.

The present description may also apply to distance sensors, which may be used to measure the distance that a vehicle travels. Odometers may be used for dead reckoning when GNSS signals are not available. Odometers may be out of calibration if the tire size, tire pressure, tire load, etc., are not considered. Thus, two different machines with two different odometers may be out of calibration relative to one another and thus, the present post calibration, and correction processes can be applied.

Further, in cut-to-length forestry applications, the length of logs and the diameter of logs may be measured to aid in managing mill forest inventory. Multiple machines may be operating in proximity to where trees have similar genetics, planting dates, growing conditions, etc. This may result in the trees having very similar sizes. Using spatial similitude of the trees, machine sensors of length and diameter may be post calibrated and/or corrected.

All of these scenarios are contemplated herein.

Figure 11:
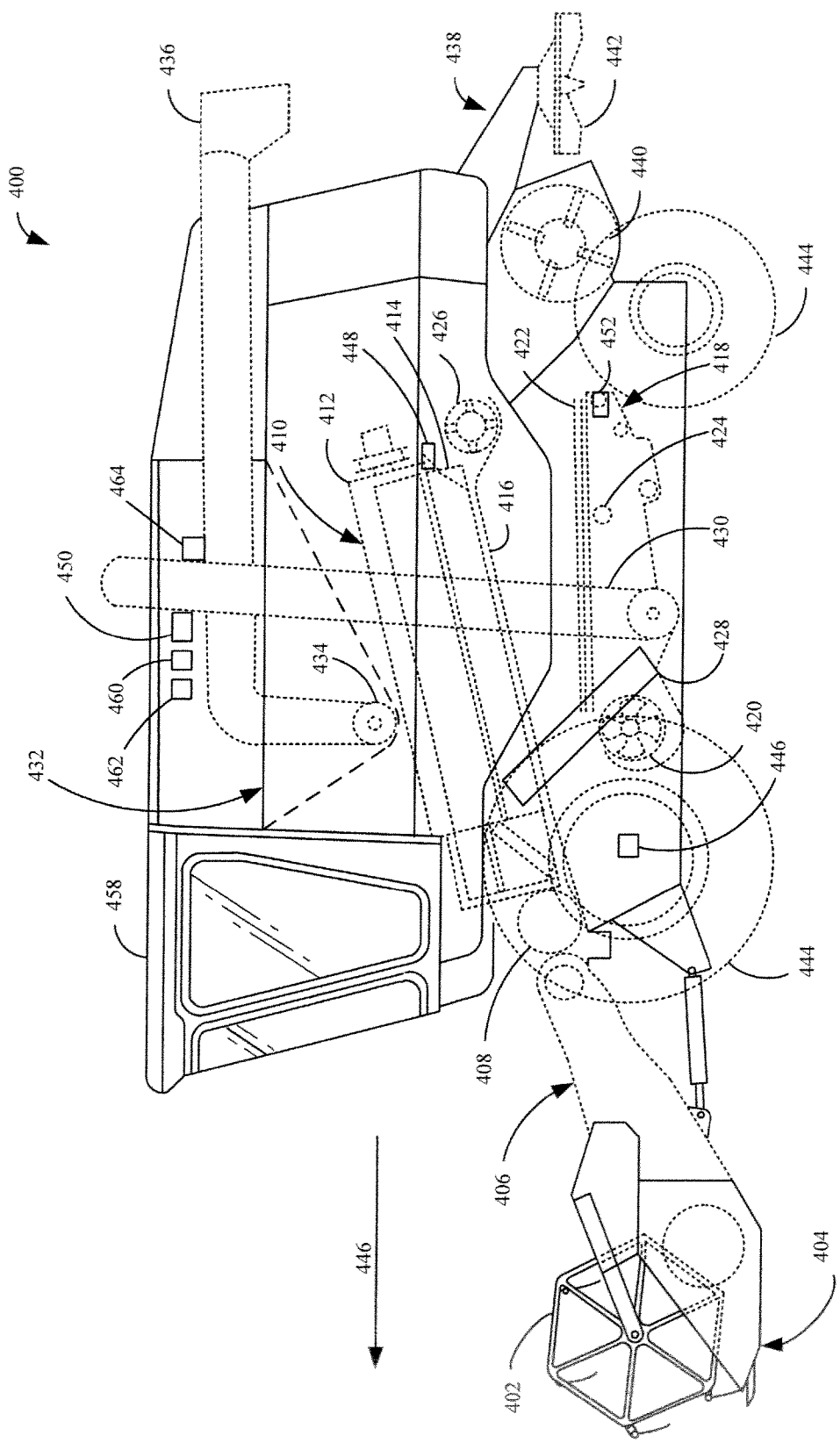
FIG. 11 is a pictorial view of one example of an agricultural machine, such as a combine harvester.

Prior to describing the operational control insights that are provided by calibration correction system 138, additional examples of an agricultural machine 100 will first be described. FIG. 11 is a partial pictorial partial schematic illustration of machine 100, in an example where machine 100 is a combine 400. It can be seen in FIG. 11 that combine 400 illustratively includes an operator compartment 458, and a set of front end equipment that includes a header 402, and a cutter generally indicated at 404. Combine 400 can also include a feeder house 406, a feed accelerator 408 and a thresher generally indicated at 410. Thresher 410 illustratively includes a threshing rotor 412 and a set of concaves 414. Further, combine 400 can include a separator 416 that includes a separator rotor. Combine 400 can include a cleaning subsystem (or cleaning shoe) 418 that, itself, can include a cleaning fan 420, chaffer 422, and sieve 424. The material handling system in combine 400 can also include discharge beater 426, tailings elevator 428, clean grain elevator 430 as well as unloading auger 434 and spout 436. Combine 400 can further include a residue subsystem 438 that can include chopper 440 and spreader 442. Combine 400 can also have a propulsion subsystem that includes an engine that drives ground engaging wheels 444 or tracks, etc. It will be noted that combine 400 may also have more than one of any of the subsystems mentioned above.

In operation, and by way of illustration only, combine 400 illustratively moves through a field and in a direction generally indicated by arrow 446. As it moves, header 402 engages the crop that is harvested and gathers the crop towards cutter 404. Once the crop is cut, the crop is moved by a conveyor in feeder house 406 toward feed accelerator 408 which accelerates the crop into thresher 410. The crop is threshed by rotor 412 rotating the crop against concave 414. The threshed crop is moved by a separated rotor and separator 416 where some of the residue is moved by discharge beater 426 towards the residue subsystems 438. It can be chopped by residue chopper 440 and spread on the field by spreader 442. In other implementations the residue simply dropped in a windrow instead of being chopped and spread.

Grain falls to cleaning shoe (or cleaning subsystem) 418. Chaffer 422 separates some of the larger material from the grain and sieve 424 separates some of the finer material from the clean grain. Clean grain falls to an auger in clean grain elevator 430, which moves the clean grain upward and deposits it into clean grain tank 432. Residue can be moved from the cleaning shoe 418 by airflow generated by cleaning fan 420. That residue can be moved rearwardly in combine 400 toward the residue handling subsystem 438.

FIG. 11 also illustratively shows that, in one example, combine 400 can include a ground speed sensor 446, one or more separator loss sensors 448, a clean grain camera 450, and one or more cleaning shoe loss sensors 452. Ground speed sensor 446 illustratively senses the travel speed of combine 400 over the ground as the combine moves in a direction generally indicated by arrow 446. Sensing the ground speed can be done by sensing the speed of the rotation of the wheels, drive shaft, the axel, or other components. The travel speed may also by a positioning system, such as geospatial system 120, generally represented by geospatial sensor 460 in FIG. 11.

Cleaning shoe loss sensors 452 illustratively provide an output signal indicative of the quantity of grain loss by both the right and left sides of the cleaning shoe 418. In one example, sensors 452 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 452 can comprise only a single sensor as well, instead of separate sensors for each shoe.

Separator loss sensors 448 provides a signal indicative of grain loss in the left and right separators. The sensors associated with the left and right separators can provide separate grain loss signals or a combined or aggregate signal. As can be done using a wide variety of different types of sensors as well, it will be noted that separator loss sensors 448 may also comprise only a single sensor, instead of separate left and right sensors.

It will also be noted that the sensors described with respect to combine 400 (in addition to the sensors already described with respect to machine 100) can include other sensors as well. For instance, it may include a moisture sensor that is configured to sense the moisture level of the material that is passing through combine 400, and/or sense the moisture level of the soil that combine 400 passes over during operation. Combine 400 may also include a machine state sensor 462 that is configured to sense whether combine 400 is configured to drop the residue, drop a windrow, or perform another machine operation. They can also include cleaning shoe fan speed sensors that can be configured proximate fan 420 to sense the speed of the fan. They can include machine setting sensors that are configured to sense the various configurable settings on combine 400. They can also include a machine orientation sensor that can be any of a wide variety of different types of sensors that sense the orientation of combine 400. For instance, the sensed orientation may identify the orientation of the combine 400, the position of parts of combine 400 relative to other parts, or the position of the parts relative to the ground, etc. Another example of machine orientation sensors includes a sensor that senses the height of a header 402 above the ground. Further, crop property sensors can sense a variety of different crop properties such as crop type, crop moisture, and other crop properties. Other crop properties may include different grain constituents such as, but not by limitation, oil, starch, and protein properties. More particularly, the crop property sensors may sense characteristics of the crop as they are being processed by machine 400, for example as the crop is being passed through a grain elevator 430. One particular example of a crop property sensor includes a mass flow rate sensor 464 that senses the mass flow rate of a crop through elevator 430, or provides other output signals indicative of similar variables.

As such, the size and number of sensors used with the systems described herein may vary. In addition, or alternatively, inferred measurements may be obtained from virtual sensors. In one example, virtual sensors include combinations and series of combinations of communication between related inputs, commands, and actual sensors that, together, provide said inferred measurements.

Figure 12A:
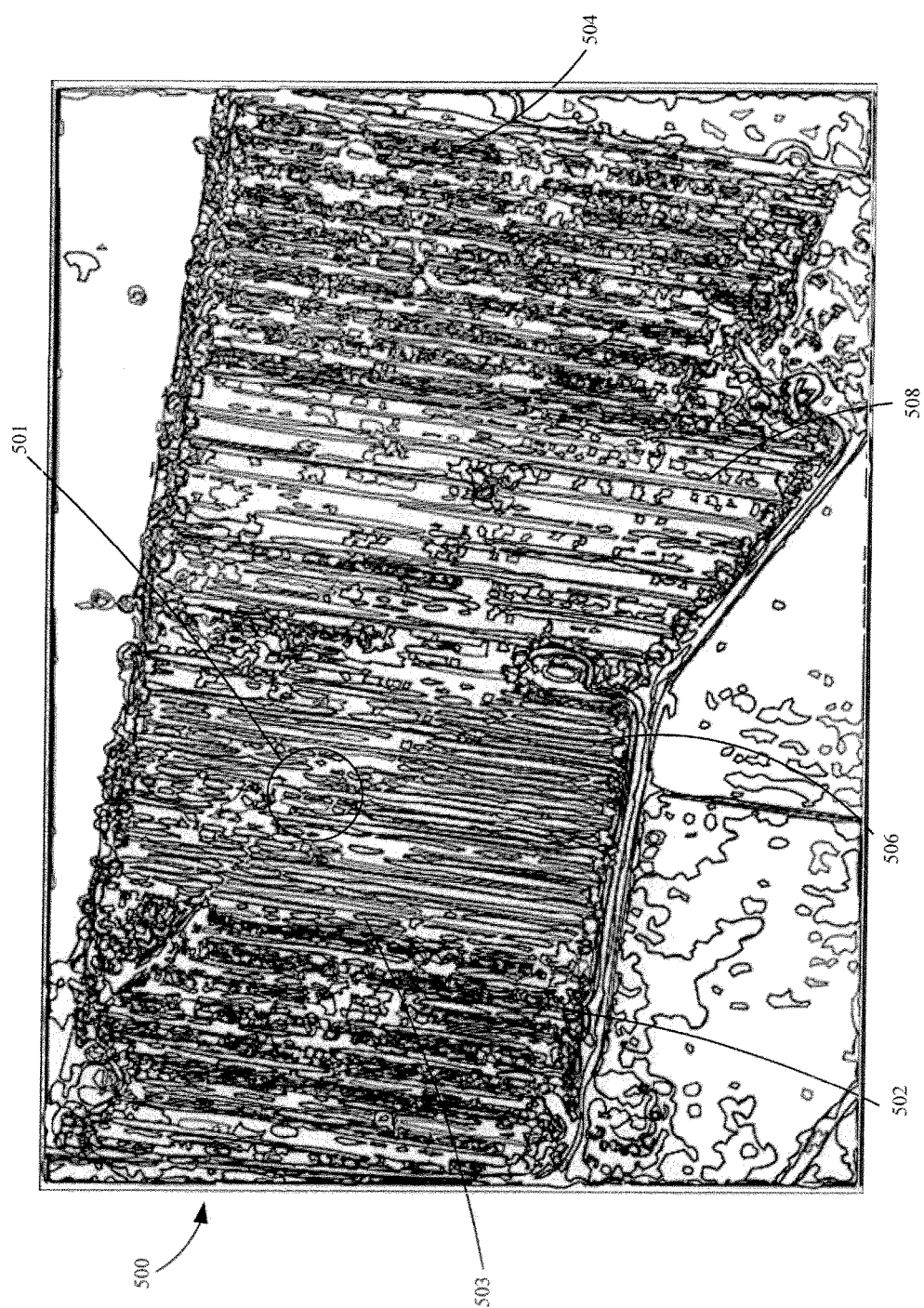
FIG. 12A shows a pictorial view of a field plot representing a measured agronomic parameter such as crop yield.

FIG. 12A shows a pictorial view of a field plot representing a measured agronomic parameter such as crop yield. The field plot 500 generally depicts an original set of parameter data obtained with an agricultural machine, where that data is not pre-processed or corrected in accordance with calibration correction system 138. For instance, field map plot 500 represents a crop yield with respect to a location in the field as determined by a mass flow sensor. More specifically, but not by limitation, operational parameter monitoring system 118 may utilize a mass flow sensor 122 and geospatial system 120 in accordance with yield monitoring logic 124 to obtain a relational set of data that is provided by field map generator 150 in the form generally shown by field map plot 500. It can be seen that field map plot 500 depicts data with a high degree of variance between the sensed crop yield throughout the field. Specifically, there are individual rows that vary quite significantly when compared to a neighboring row. For instance, each row may correspond to a header width, and sensor information from sensors across the header may vary. However, it is also noted that variances in the original parameter data may manifest in the map for specific plant rows or even a single plant, where information for that plants is sensed either individually or as a set of plants. This map likely reflects data inaccuracies as crop yield is unlikely to vary this much between neighboring rows. In one example, sensed high density areas (sensed high crop yield) are generally colored red, while sensed medium density areas are generally colored yellow, and sensed low density areas are generally colored blue.

To further illustrate, it can be generally seen near portions 502 and 504 that a high crop yield was originally sensed with monitoring system 118. To the contrary, it is generally shown in portions 506 and 508 that a relatively low crop yield was sensed by system 118. A sensed medium crop yield was generally sensed at the area represented by reference numeral 503. Such a high degree of variability as presented in a map can be confusing when the map is viewed by operator 166 or a farm manager, agronomic consultant, or others. Further, a group of transient characteristics is generally indicated by the cluster of specks within the circle referenced as numeral 501. Plot 500 provides little insight as to the performance of the crop as well as the performance of the machine in harvesting the crop.

Figure 12B:
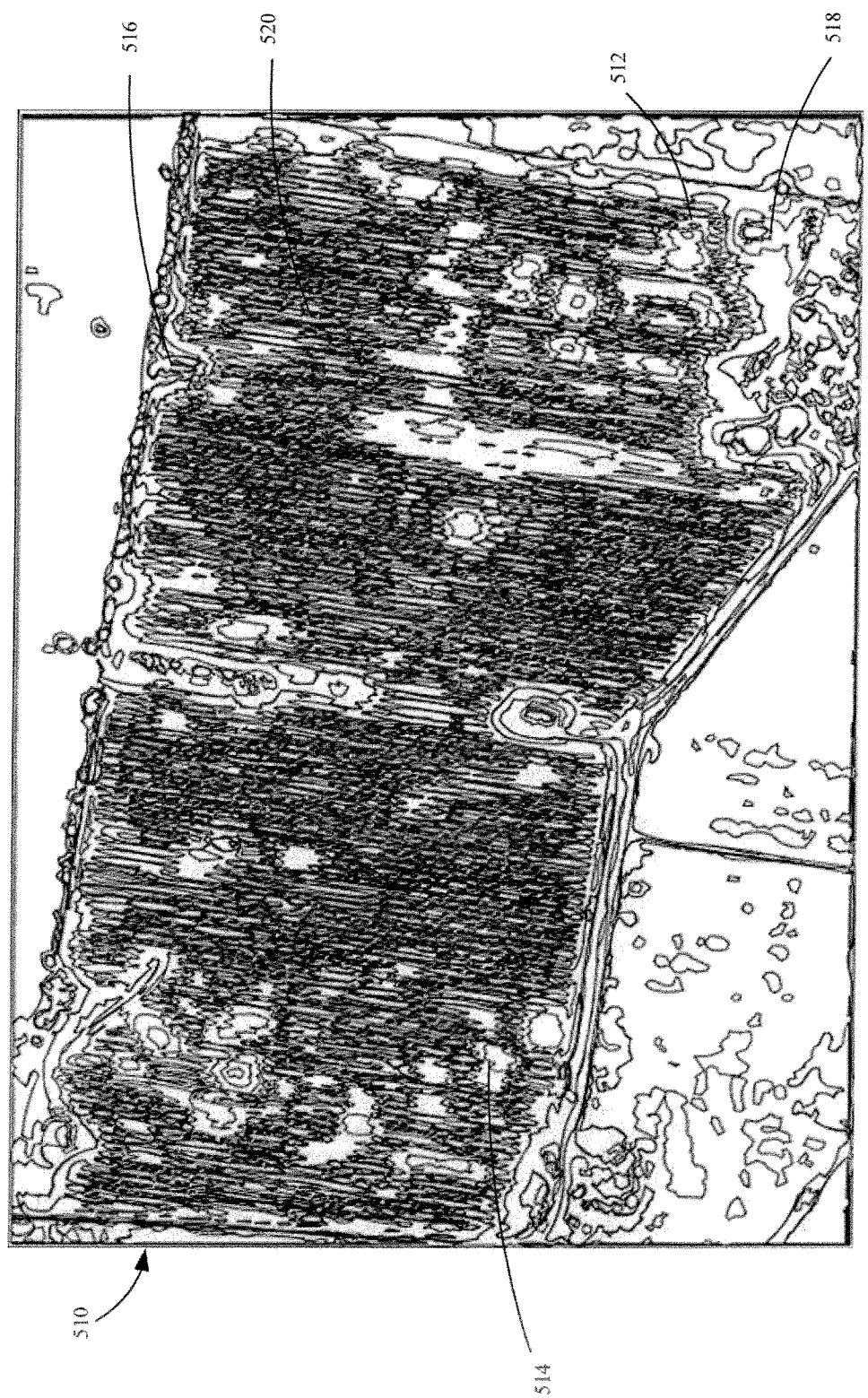
FIG. 12B shows a pictorial view of a smooth field plot representing an adjusted agronomic parameter such as crop yield.

FIG. 12B shows a pictorial view of a processed field plot 510 representing an adjusted and corrected agronomic parameter such as crop yield. In one example, calibration correction system 138 has utilized pre-processing logic 142, and biasing collection logic 144 to prepare crop yield data and perform a smoothing operation on that data. It may be seen that plot 510 generally indicates a lesser degree of variance between the various portions of the field and the adjusted crop yield values, when compared to the raw data indications of plot 500. In one example, bias correction logic 144 utilizes smoothing logic 178 to remove a determined calibration bias either between separate instances of a single machine, or individual instances of a plurality of machines operating in the same field. For example, it can be seen in plot 510 that the transient characteristics have been removed (e.g. represented by 501 in plot 500), and that smoothed high density areas are generally represented by reference numerals 512 and 514. On the other hand, smoothed low density areas are generally represented by reference numerals 516 and 518. One example of a smoothed medium density area is generally represented by reference numeral 520. As such, smoothed high density (e.g. high crop yield) is represented by regions that are colored red, while smoothed medium density is represented by regions that are colored yellow, and smoothed low density is represented by regions that are colored blue.

Field plot 510 provides an accurate field map, as generated by field map generator 150, that allows an operator 166 to glean insights relating to the operation of agricultural machine 100 and the performance of the particular crop that is harvested. Of course, it is noted that map 510 may be also representative of any of the other previously discussed operational or agronomic parameters herein.

Figure 13:
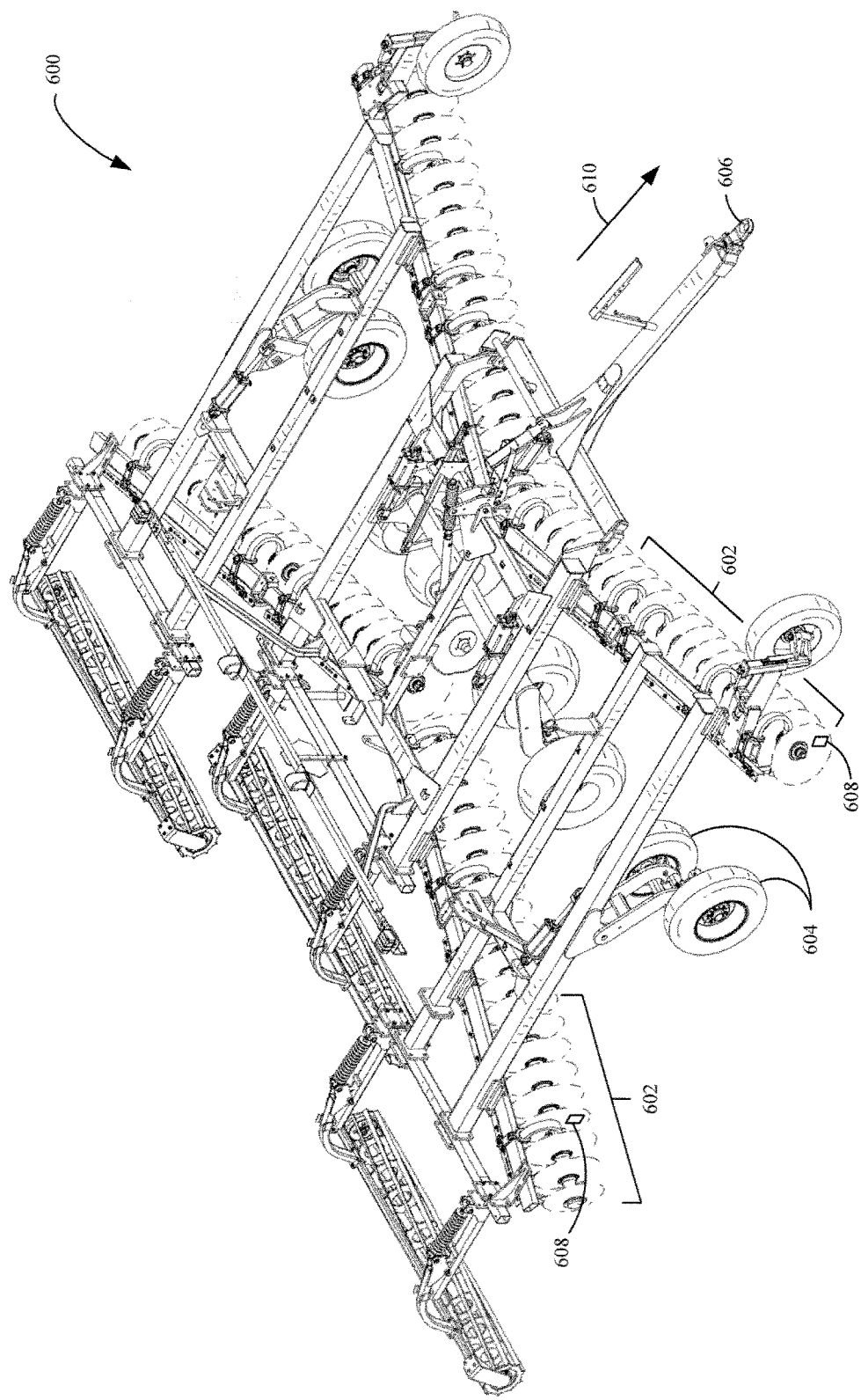
FIG. 13 is a pictorial view of one example of an agricultural machine such as a tillage machine.

FIG. 13 is a pictorial view of another example in which agricultural machine 100 is shown as a tillage machine 600 (or disc). Tillage machine 600 illustratively includes a variety of tillage implements 602 which generally include rotating disks that form trenches in a ground surface as machine 600 moves in a direction generally indicated by arrow 610. It is noted that tillage machine 600 is one representative view of a tillage machine and the calibration correction mechanisms discussed herein may be implemented on a variety of other tillage machines as well. Tillage machine 600 also illustratively includes guide wheels 604 and a mechanism for connecting to a powered mobile machine, the mechanism generally depicted at reference numeral 606. Tillage machine 600 may also include a variety of operational parameter sensors. For example, a tillage machine 600 includes tillage depth sensors 608 which may be disposed in a variety of locations on the machine but which are particularly illustratively disposed at or near disks 602. The tillage depth sensors 608 may sense a depth of the disk 602 within a ground surface, and provide the sensed data to other monitoring logic 130 of operational parameter monitoring system 118. As discussed above with respect to agricultural machine 100, the sensed parameter data may be utilized by calibration correction system 138 to determine a bias correction factor between the individual sensors 608 on machine 600, and/or the calibration bias between machine 600 and a variety of other sensors disposed on other tillage machines performing a similar or same operation.

Other soil conditions may also be monitored by machine 600 or any other agricultural machine described herein. These other soil conditions may include, but are not limited to soil moisture, soil temperature, organic matter composition, soil nutrient levels, bulk soil density, and planter down pressure with respect to a ground surface, among others.

Figure 14:
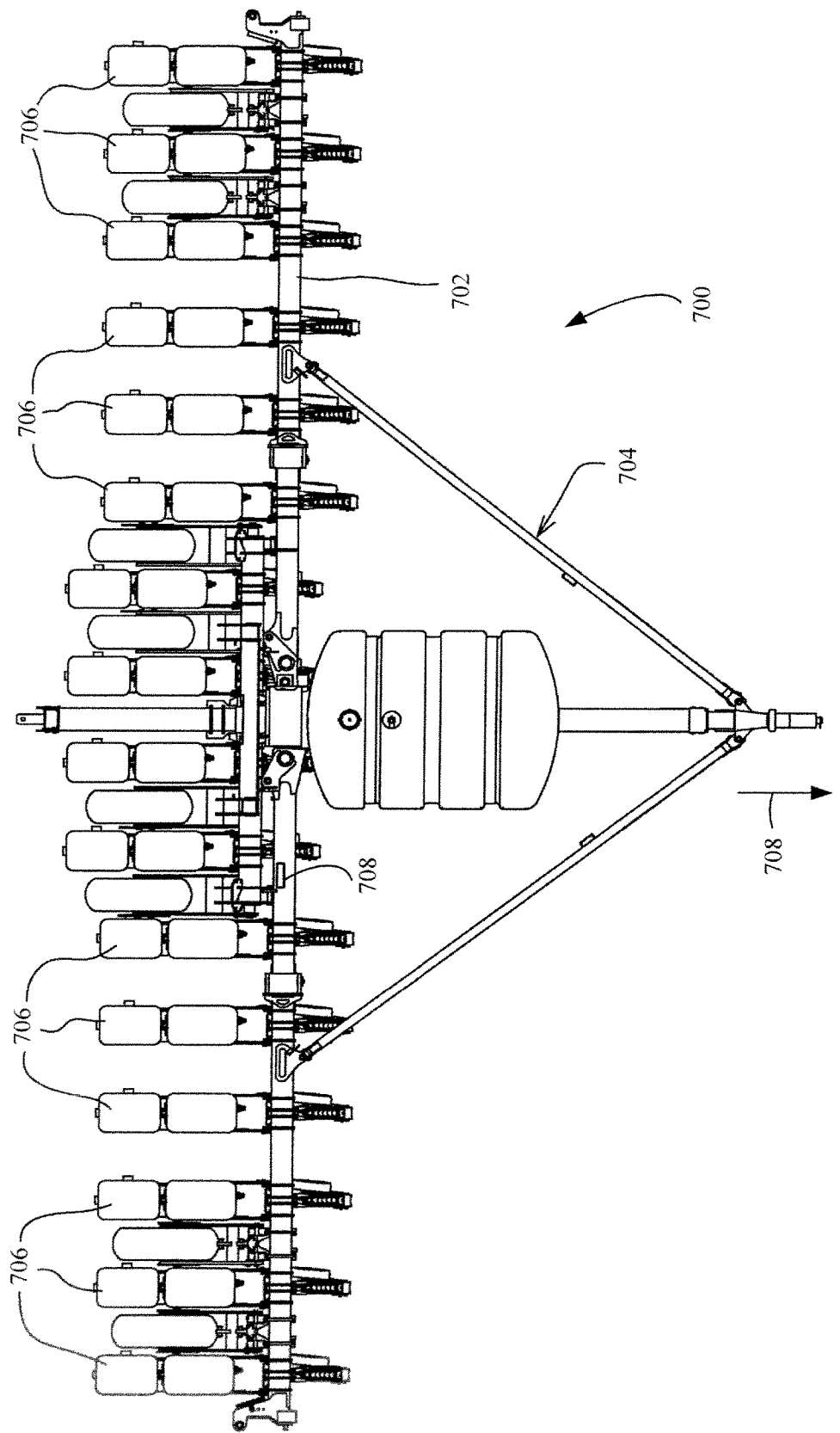
FIG. 14 is a pictorial view of one example of an agricultural machine such as a planter.

FIG. 14 is a pictorial view of one example in which agricultural machine 100 is shown as a planter 700. Planter 700 illustratively includes a supporting structure 702 which houses a plurality of planting row units 706. Planter 700 may also include an interface for connecting to a power mobile machine, the interface generally being represented by 704. As similarly discussed with respect agricultural machine 100 and tillage machine 600, planting machine 700 may include a variety of sensors disposed at a variety of locations on the machine and configured to sense parameters such as, but not limited to, a planting depth. In one particular example, machine orientation sensors 708 may sense the height of a planting depth sensor with respect to the ground. These machine orientation sensors may include the planting depth sensors that provide planting depth data in accordance with planting depth monitoring logic 128 and operational parameter monitoring system 118. The obtained planting depth data may be utilized by calibration correction system 138 to determine an offset either between individual sensors on planter 700, and/or between sensors and a determined calibration of machine 700 and a variety of other similar planting machines.

Other example agricultural machines (or any of the machines described above), in accordance with embodiments described herein, may include sprayers or applicators for applying, for instance, fertilizers, pesticides, or other nutrient formulas. Operational parameter monitoring may be performed to obtain information regarding the rate at which said formulas are applied. As such, the calibration correction system and methods described herein may be used accordingly in determining a proper calibration and reducing calibration bias for chemical application operations, and specifically for operations that include measuring the rate at which a formula is applied during operation. As such, the agronomic data that can be monitored and adjusted with embodiments of a calibration correction system discussed herein includes data associated with grain moisture, grain loss, grain quality, residue yield, residue quality, unthreshed properties, chemical application rate, soil moisture, soil temperature, organic matter composition, soil nutrient levels, bulk soil density, and planter down pressure with respect to a ground surface, among others.

The present discussion has mentioned processors and/or servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All stores can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 15:
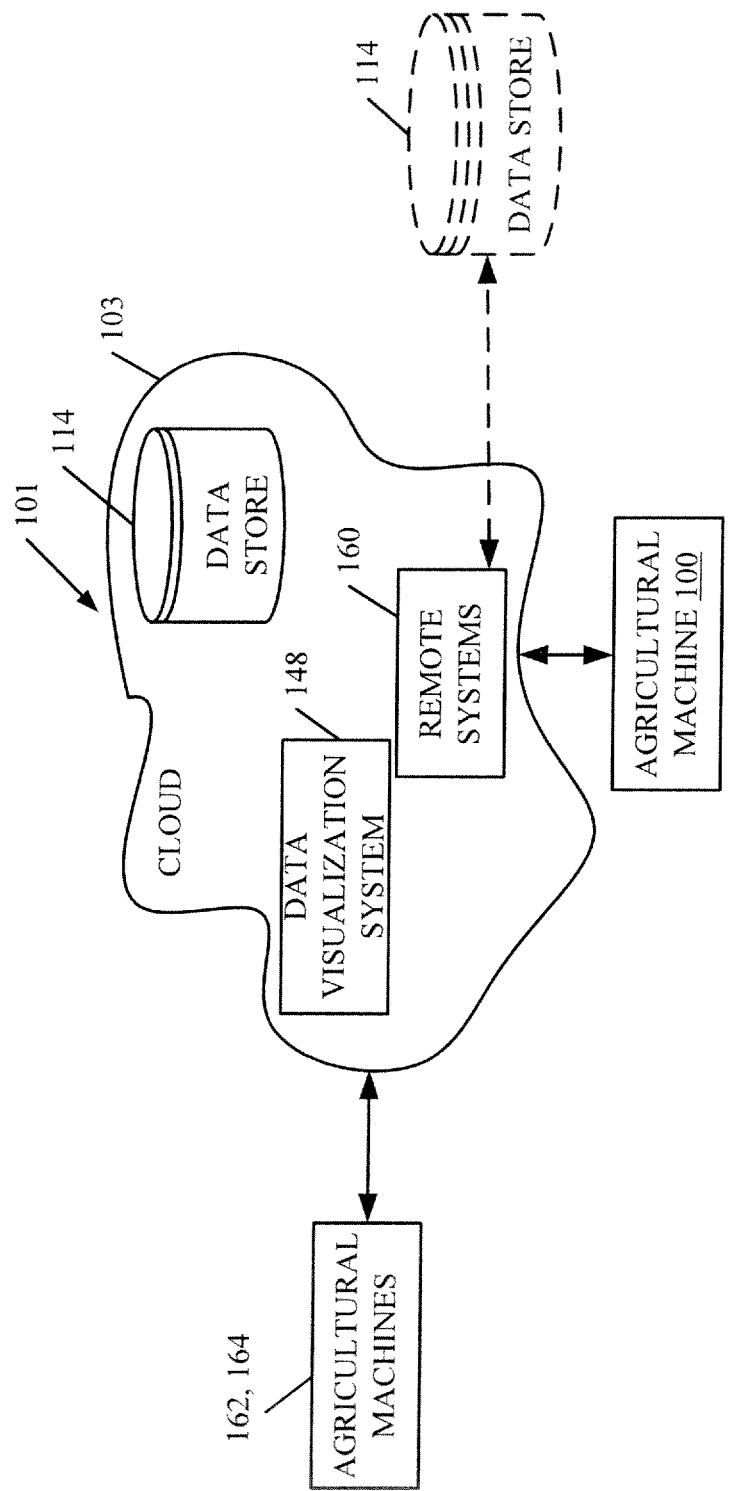
FIG. 15 is a block diagram of one example of an agricultural machine deployed with a remote server architecture.

FIG. 15 is a block diagram of agricultural machine 100, shown in FIGS. 1 and 4, except that it communicates with elements in a remote server architecture 101. In an example embodiment, remote server architecture 101 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 15, some items are similar to those shown in FIGS. 1 and 4 and they are similarly numbered. FIG. 15 specifically shows that data visualization system 148, remote systems 160 and data store 114 can be located at a remote server location 103. Therefore, harvester 100 accesses those systems through remote server location 103.

FIG. 15 also depicts another example of a remote server architecture. FIG. 15 shows that it is also contemplated that some elements of FIG. 1 are disposed at remote server location 103 while others are not. By way of example, data store 114 or agricultural machines 162, 164 can be disposed at a location separate from location 103, and accessed through the remote server at location 103. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the combine or machine comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 16:
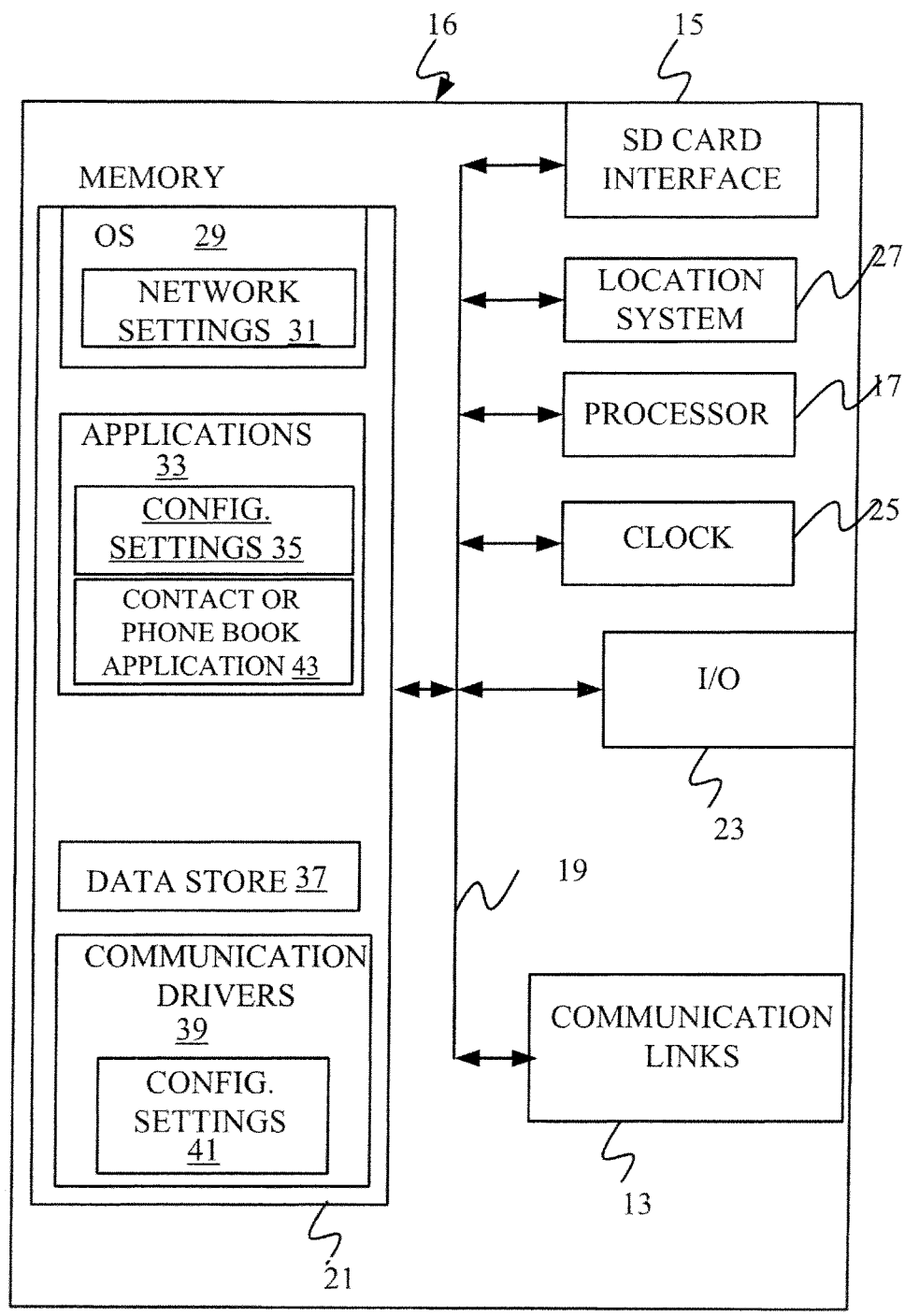
FIG. 16 is a block diagram of one example of a mobile computing device in which the present system (or parts of it) can be deployed.
Figure 17:
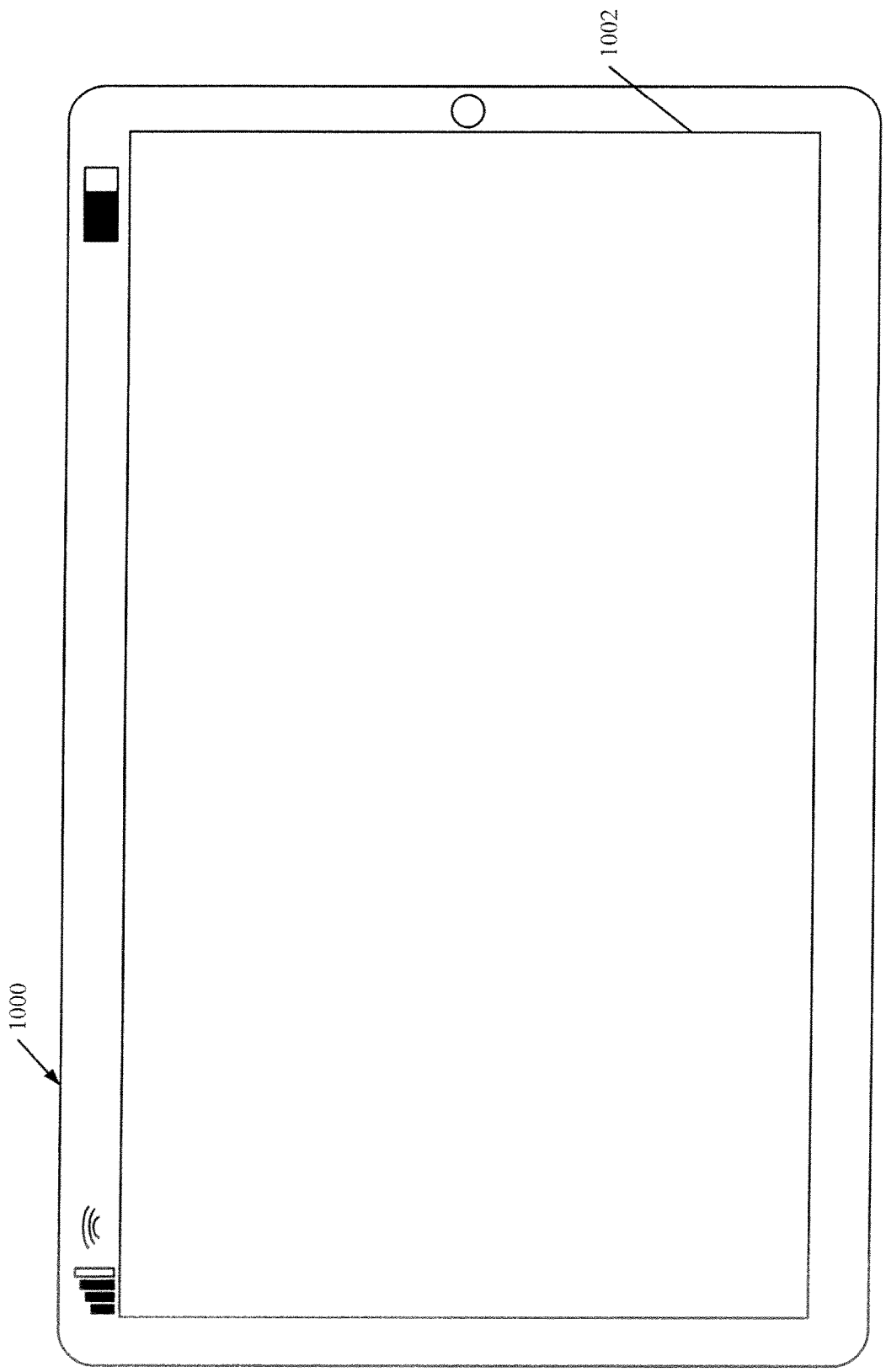
FIG. 17 shows one example of a mobile device such as a tablet computer in which the present system (or parts of it) can be deployed.
Figure 18:
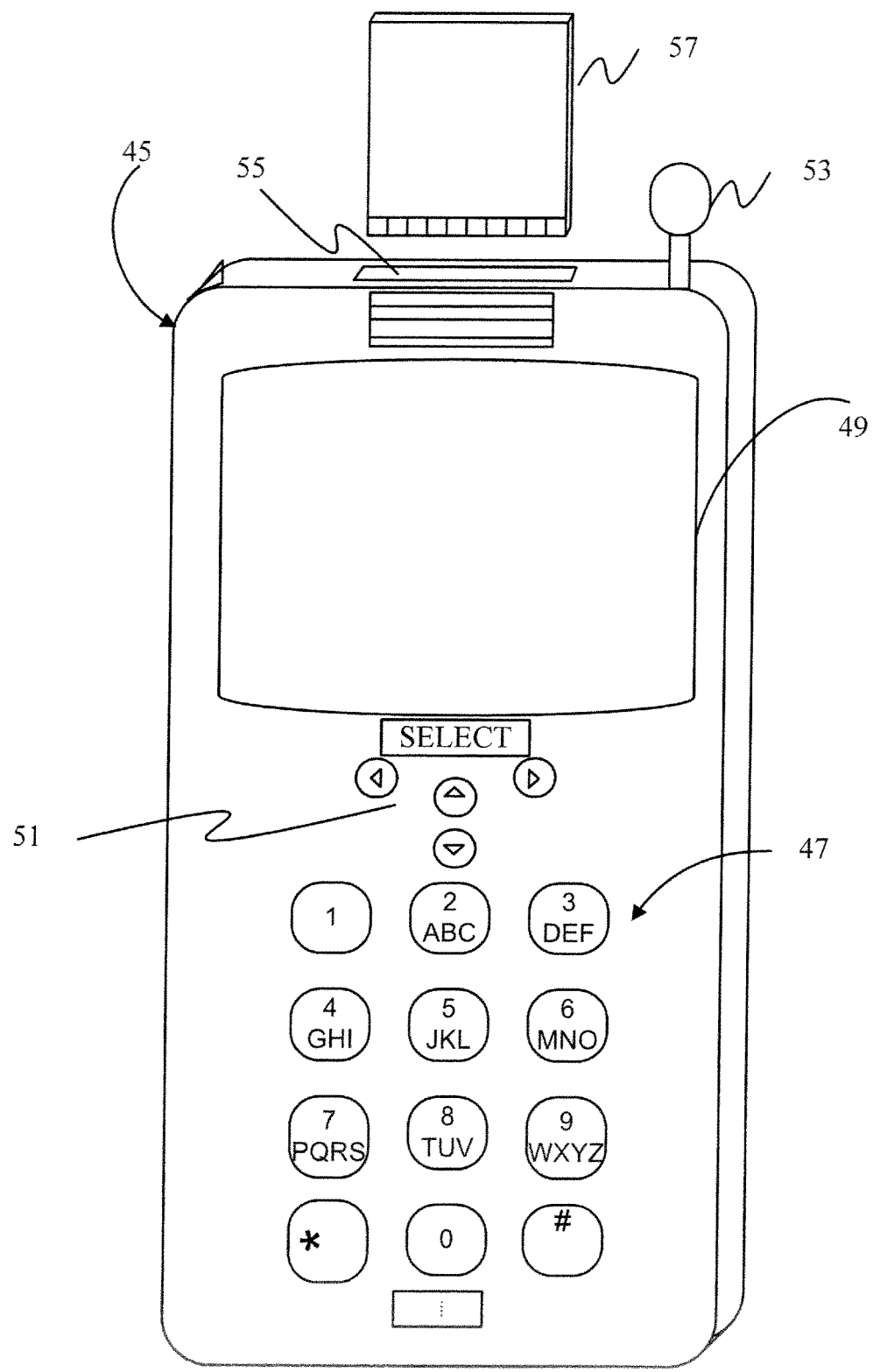
FIG. 18 shows one example of a mobile device in which the present system (or parts of it) can be deployed.
Figure 19:
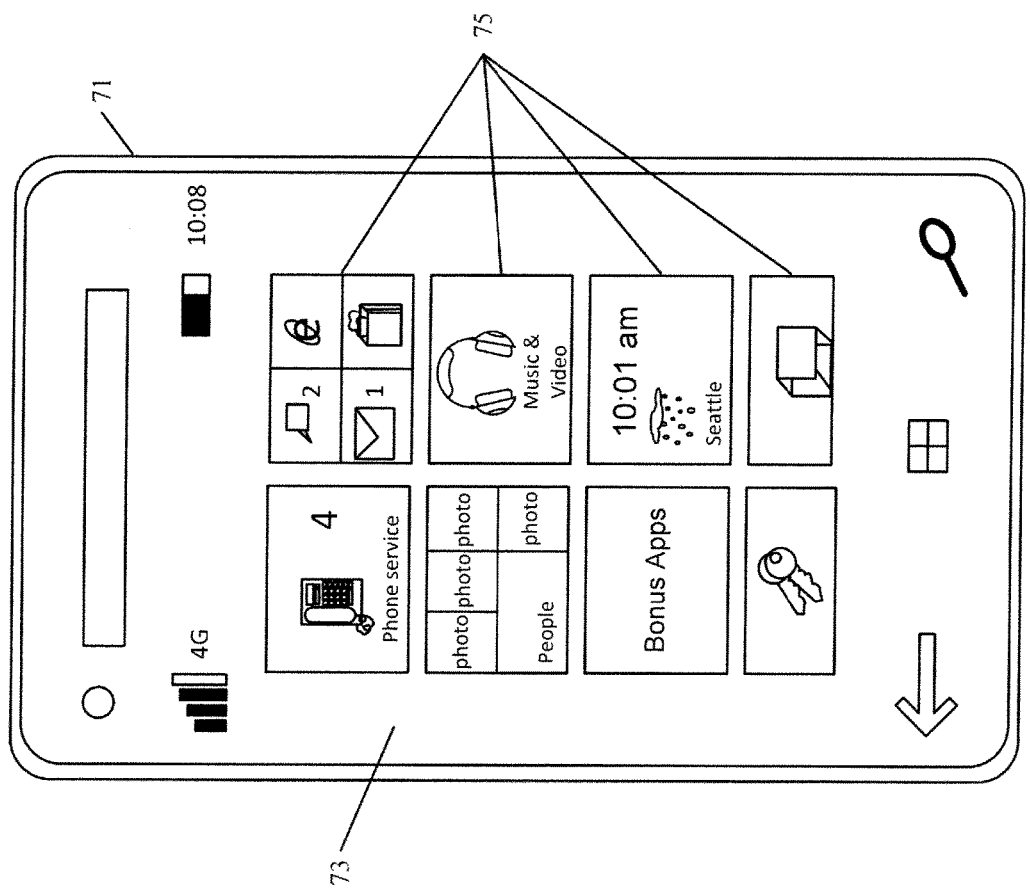
FIG. 19 shows one example of a mobile device such as a smart phone in which the present system (or parts of it) can be deployed.

FIG. 16 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 100 for use in generating, processing, or displaying the data. FIGS. 17-19 are examples of handheld or mobile devices.

FIG. 16 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 (which can also embody processors from FIGS. 1 and 4) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 17 shows one example in which device 16 is a tablet computer 1000. In FIG. 17, computer 1000 is shown with user interface display screen 1002. Screen 1002 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 1000 can also illustratively receive voice inputs as well.

FIG. 18 provides an additional example of devices 16 that can be used, although others can be used as well. In FIG. 18, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals. In some embodiments, phone 45 also includes a Secure Digital (SD) card slot 55 that accepts a SD card 57.

FIG. 19 is similar to FIG. 18 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. Note that other forms of the devices 16 are possible.

Figure 20:
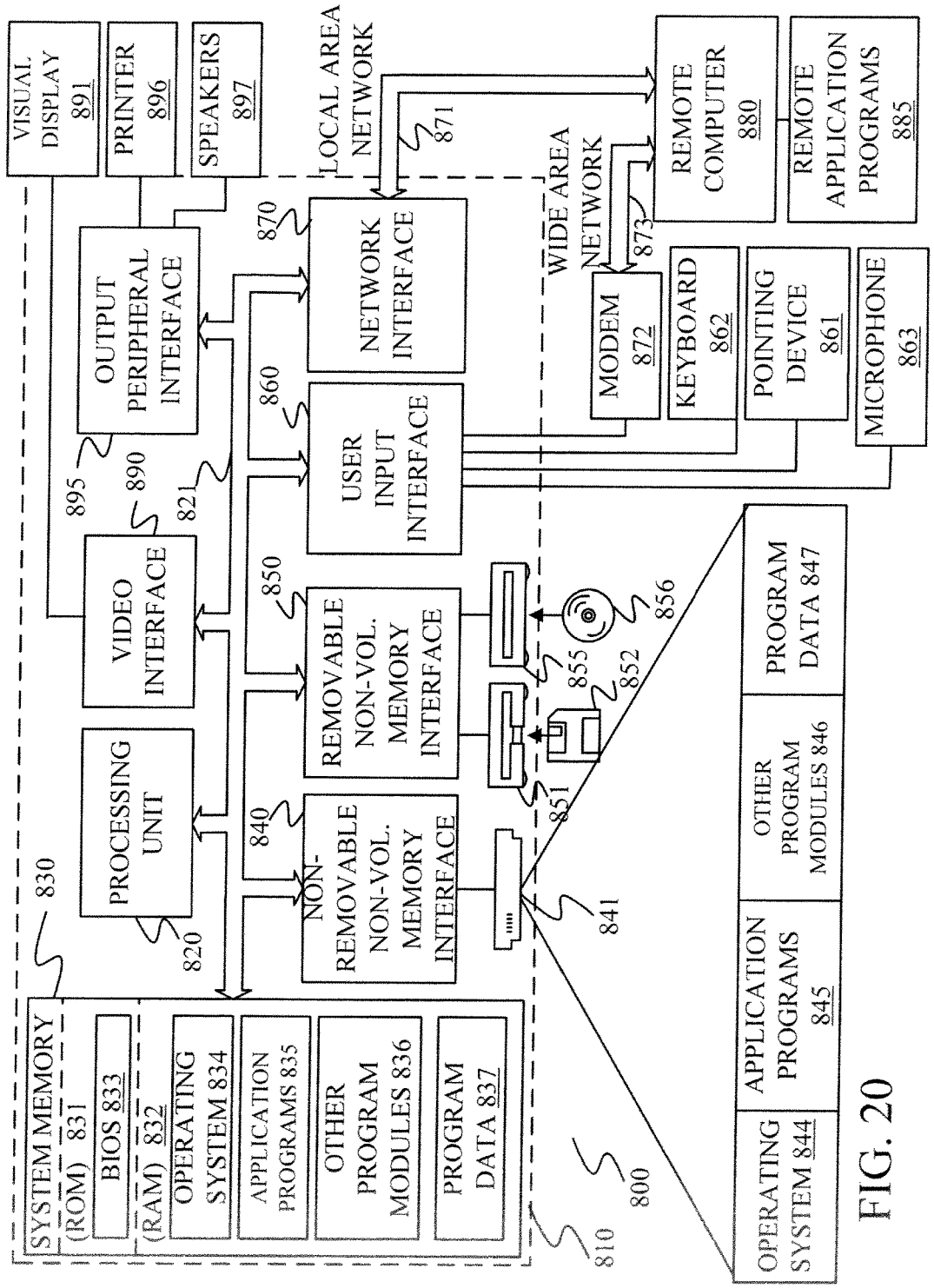
FIG. 20 is one example of a computing environment in which the present system (or parts of it) can be deployed.

FIG. 20 is one example of a computing environment in which elements of FIG. 1, or parts of it, (for example) can be deployed. With reference to FIG. 20, an example system for implementing some embodiments includes a general-purpose computing device in the form of a computer 810. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1 and 4 can be deployed in corresponding portions of FIG. 20.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 20 illustrates operating system 834, application programs 835, other program modules 836, and program data 837.

The computer 810 may also include other removable/non-removable volatile/nonvolatile computer storage media. By way of example only, FIG. 20 illustrates a hard disk drive 841 that reads from or writes to non-removable, nonvolatile magnetic media, a magnetic disk drive 851, nonvolatile magnetic disk 852, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 20, provide storage of computer readable instructions, data structures, program modules and other data for the computer 810. In FIG. 20, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 20 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a computer-implemented method on a first mobile machine, comprising:
generating, on the first mobile machine, first sensor data indicative of a sensed operational parameter sensed by a first sensor on the first mobile machine operating at a worksite;
receiving, on the first mobile machine, second sensor data indicative of the operational parameter sensed by a second sensor on a second mobile machine operating at the worksite;
performing a calibration of the first sensor data using the second sensor data to obtain calibrated first sensor data; and
configuring the first sensor based on the calibrated first sensor data.

Example 2 is the computer-implemented method of any or all previous examples wherein the first sensor comprises an aggregate sensor that senses the operational parameter on the first mobile machine to obtain first aggregate sensor data and wherein the first mobile machine includes a plurality of sectional sensors that sense a component of the operational parameter sensed by the aggregate sensor to obtain sectional sensor data, and wherein performing a calibration comprises:
performing the calibration on the first aggregate sensor data to obtain calibrated aggregate sensor data.

Example 3 is the computer-implemented method of any or all previous examples and further comprising:
performing a calibration of the sectional sensor data based on the calibrated aggregate sensor data to obtain calibrated sectional sensor data.

Example 4 is the computer-implemented method of any or all previous examples and further comprising:
configuring the sectional sensors based on the calibrated sectional sensor data.

Example 5 is the computer-implemented method of any or all previous examples wherein the first mobile machine has a first plurality of sectional data sensors and wherein the second mobile machine has a second plurality of sectional data sensors and wherein performing the calibration comprises:
identifying a similitude among sensors in the first plurality of sectional data sensors to obtain, for each sectional data sensor, a set of similarly situated sensors.

Example 6 is the computer-implemented method of any or all previous examples wherein performing a calibration comprises:
selecting a sectional data sensor, from the first or second plurality of sectional data sensors, to be calibrated;
identifying the set of similarly situated sensors that are similarly situated to the selected sectional data sensor; and
preferentially weighting sensor data from the set of similarly situated sensors, that are similarly situated to the selected sectional data senor, in performing a calibration of the sensor data from the selected sectional data sensor.

Example 7 is the computer-implemented method of any or all previous examples wherein identifying a similitude comprises:
identifying a similitude among sensors in the first plurality of sectional data sensors and sensors in the second plurality of sectional data sensors to obtain, for each sectional data sensor, the set of similarly situated sensors.

Example 8 is the computer-implemented method of any or all previous examples wherein identifying a similitude among sensors comprises:
identifying the similitude based on a machine position of the sectional data sensors on the first or second mobile machine.

Example 9 is the computer-implemented method of any or all previous examples wherein identifying a similitude among sensors comprises:
identifying the similitude based on a geographic proximity of locations where sensed operational parameters, sensed by the sectional data sensors on the first or second mobile machines, are manifested.

Example 10 is the computer-implemented method of any or all previous examples wherein identifying a similitude among sensors comprises:

identifying the similitude based on worksite attributes of the worksite where the first and second mobile machines are operating.

Example 11 is a first mobile machine, comprising:

a first sensor generating, on the first mobile machine, first sensor data indicative of a sensed operational parameter sensed by the first sensor on the first mobile machine operating at a worksite;

a communication system receiving, on the first mobile machine, second sensor data indicative of the operational parameter sensed by a second sensor on a second mobile machine operating at the worksite;

a calibration correction system, on the first mobile machine, performing a calibration of the first sensor data using the second sensor data to obtain calibrated first sensor data; and sensor calibration logic configuring the first sensor based on the calibrated first sensor data.

Example 12 is the first mobile machine of any or all previous examples wherein the first sensor comprises an aggregate sensor that senses the operational parameter on the first mobile machine to obtain first aggregate sensor data and wherein the first mobile machine further comprises a plurality of sectional sensors that sense a component of the operational parameter sensed by the aggregate sensor to obtain sectional sensor data, and wherein the calibration correction system comprises:

aggregate sensor data calibration logic configured to perform the calibration on the first aggregate sensor data to obtain calibrated aggregate sensor data.

Example 13 is the first mobile machine of any or all previous examples and further comprising:

sectional sensor data calibration logic configured to perform a calibration of the sectional sensor data based on the calibrated aggregate sensor data to obtain calibrated sectional sensor data.

Example 14 is the first mobile machine of any or all previous examples and further comprising:

sectional sensor calibration logic configured to configure the sectional sensors based on the calibrated sectional sensor data.

Example 15 is the first mobile machine of any or all previous examples and further comprising a first plurality of sectional data sensors and wherein the second mobile machine has a second plurality of sectional data sensors and wherein the first mobile machine further comprises:

a sensor similitude identifying system configured to identify a similitude among sensors in the first plurality of sectional data sensors to obtain, for each sectional data sensor, a set of similarly situated sensors, the calibration correction system being configured to select a sectional data sensor, from the first or second plurality of sectional data sensors, to be calibrated, identify the set of similarly situated sensors that are similarly situated to the selected sectional data sensor, and preferentially weight sensor data from the set of similarly situated sensors, that are similarly situated to the selected sectional data senor, in performing a calibration of the sensor data from the selected sectional data sensor.

Example 16 is the first mobile machine of any or all previous examples wherein the sensor similitude identifying system is configured to identify a similitude among sensors in the first plurality of sectional data sensors and sensors in the second plurality of sectional data sensors to obtain, for each sectional data sensor, the set of similarly situated sensors.

Example 17 is the first mobile machine of any or all previous examples wherein the sensor similitude identifying system comprises:

machine position logic configured to identify the similitude based on a machine position of the sectional data sensors on the first or second mobile machine.

Example 18 is the first mobile machine of any or all previous examples wherein the sensor similitude identifying system comprises:

geographic proximity logic configured to identify the similitude based on a geographic proximity of locations where sensed operational parameters, sensed by the sectional data sensors on the first or second mobile machines, are manifested.

Example 19 is the first mobile machine of any or all previous examples wherein the sensor similitude identifying logic comprises:

worksite attribute logic configured to identify the similitude based on worksite attributes of the worksite where the first and second mobile machines are operating.

Example 20 is a first mobile machine, comprising:

a first sensor generating, on the first mobile machine, first sensor data indicative of a sensed operational parameter sensed by the first sensor on the first mobile machine operating at a worksite;

a communication system receiving, on the first mobile machine, second sensor data indicative of the operational parameter sensed by a second sensor on a second mobile machine operating at the worksite; and a calibration correction system, on the first mobile machine performing a calibration of the first sensor data using the second sensor data to obtain calibrated first sensor data and further calibrating the second sensor data using the first sensor data to obtain calibrated second sensor data and determining that the first mobile machine is a master machine in a master/slave relationship relative to the second mobile machine and sending the calibrated second sensor data to the second mobile machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method on a first mobile machine, comprising:

generating, on the first mobile machine, first sensor data indicative of a sensed operational parameter sensed by a first sensor on the first mobile machine operating at a worksite;

receiving, on the first mobile machine, second sensor data indicative of the operational parameter sensed by a second sensor on a second mobile machine operating at the worksite;

performing a calibration of the first sensor data using the second sensor data to obtain calibrated first sensor data; and configuring the first sensor based on the calibrated first sensor data.

2. The computer-implemented method of claim 1 wherein the first sensor comprises an aggregate sensor that senses the operational parameter on the first mobile machine to obtain first aggregate sensor data and wherein the first mobile machine includes a plurality of sectional sensors that sense a component of the operational parameter sensed by the aggregate sensor to obtain sectional sensor data, and wherein performing a calibration comprises:
performing the calibration on the first aggregate sensor data to obtain calibrated aggregate sensor data.

3. The computer-implemented method of claim 2 and further comprising:
performing a calibration of the sectional sensor data based on the calibrated aggregate sensor data to obtain calibrated sectional sensor data.

4. The computer-implemented method of claim 3 and further comprising:
configuring the sectional sensors based on the calibrated sectional sensor data.

5. The computer-implemented method of claim 1 wherein the first mobile machine has a first plurality of sectional data sensors and wherein the second mobile machine has a second plurality of sectional data sensors and wherein performing the calibration comprises:
identifying a similitude among sensors in the first plurality of sectional data sensors to obtain, for each sectional data sensor, a set of similarly situated sensors.

6. The computer-implemented method of claim 5 wherein performing a calibration comprises:
selecting a sectional data sensor, from the first or second plurality of sectional data sensors, to be calibrated:,
identifying the set of similarly situated sensors that are similarly situated to the selected sectional data sensor; and
preferentially weighting sensor data from the set of similarly situated sensors, that are similarly situated to the selected sectional data senor, in performing a calibration of the sensor data from the selected sectional data sensor.

7. The computer-implemented method of claim 6 wherein identifying a similitude comprises:
identifying a similitude among sensors in the first plurality of sectional data sensors and sensors in the second plurality of sectional data sensors to obtain, for each sectional data sensor, the set of similarly situated sensors.

8. The computer-implemented method of claim 7 wherein identifying a similitude among sensors comprises:
identifying the similitude based on a machine position of the sectional data sensors on the first or second mobile machine.

9. The computer-implemented. method of claim 7 wherein identifying a similitude among sensors comprises:
identifying the similitude based on a geographic proximity of locations where sensed operational parameters, sensed by the sectional data sensors on the first or second mobile machines, are manifested.

10. The computer-implemented method of claim 7 wherein identifying a similitude among sensors comprises:
identifying the similitude based on works to attributes of the worksite where the first and second mobile. machines are operating.

11. A first mobile machine, comprising:
a first sensor generating, on the first mobile machine, first sensor data indicative of a sensed operational parameter sensed by the first sensor on the first mobile machine operating at a worksite;
a communication system receiving, on the First mobile machine, second sensor data indicative of the operational parameter sensed by a second sensor on a second mobile machine operating at the worksite;
a calibration correction system, on the first mobile machine, performing a calibration of the first sensor data using the second sensor data to obtain calibrated first sensor data; and
sensor calibration logic configuring the first sensor based on the calibrated first sensor data.

12. The first mobile machine of claim 11 wherein the first sensor comprises an aggregate sensor that senses the operational parameter on the, first mobile machine to obtain first aggregate sensor data and wherein the first mobile machine further comprises a plurality of sectional sensors that sense a component of the operational parameter sensed by the aggregate sensor to obtain sectional sensor data, and wherein the calibration correction system comprises:
aggregate sensor data calibration logic configured to perform the calibration on the first aggregate sensor data to obtain calibrated aggregate sensor data.

13. The first mobile machine of claim 12 and further comprising:
sectional sensor data calibration logic configured to perform a calibration of the sectional sensor data based on the calibrated aggregate sensor data to obtain calibrated sectional sensor data.

14. The first mobile machine of claim 13 and further comprising:
sectional sensor calibration logic configured to configure the sectional sensors based on the calibrated sectional sensor data.

15. The first mobile machine of claim 11 and further comprising a first plurality of sectional data sensors and wherein the second mobile machine has a second plurality of sectional data sensors and wherein the first mobile machine further comprises:
a sensor similitude identifying system configured to identify a similitude among sensors in the first, plurality of sectional data sensors to obtain, for each sectional data sensor, a set of similarly situated sensors, the calibration correction system being configured to select a sectional data sensor, from the first or second plurality of sectional data sensors, to he calibrated, identify the set of similarly situated sensors that are similarly situated to the selected sectional data sensor, and preferentially weight sensor data from the set of similarly situated sensors, that arc similarly situated to the selected sectional data senor, in performing a calibration of the sensor data from the selected sectional data sensor.

16. The first mobile machine of claim 15 wherein die sensor similitude identifying system is configured to identify a similitude among sensors in the first plurality of sectional data sensors and sensors in the second plurality of sectional data sensors to obtain, for each sectional data sensor, the set of similarly situated sensors.

17. The first mobile machine of claim 16 wherein the sensor similitude identifying system comprises:
machine position logic configured to identify the similitude based on a machine position of the sectional data sensors on the first or second mobile machine.

18. The first mobile machine of claim 16 wherein the sensor similitude identifying system comprises:
geographic proximity logic configured to identify the similitude based on a geographic proximity of locations where sensed operational parameters, sensed by the sectional data sensors on the first or second mobile machines, are manifested.

19. The first mobile machine of claim 16 wherein the sensor similitude identifying logic comprises:
worksite attribute logic configured to identify the similitude based on, worksite attributes of the worksite where the first and second mobile machines are operating.

20. A first mobile machine, comprising:
a first sensor generating, on the first mobile machine, first sensor data indicative of a sensed operational parameter sensed by the first sensor on the first mobile machine operating at a worksite;
a communication system receiving, on the first mobile machine, second sensor data indicative of the operational parameter sensed by a second sensor on a second mobile machine operating at the worksite; and
a calibration correction system, on the first mobile machine performing a calibration of the first sensor data using the second sensor data to obtain calibrated first sensor data and further calibrating the second sensor data using the first sensor data to obtain calibrated second sensor data and determining that the first mobile machine is a master machine in a master/slave relationship relative to the second mobile machine and sending the calibrated second sensor data to the second mobile machine.

* * * * *